(12) United States Patent
Stull et al.

(10) Patent No.: US 7,251,693 B2
(45) Date of Patent: Jul. 31, 2007

(54) SYSTEM AND METHOD FOR DATA QUALITY MANAGEMENT AND CONTROL OF HETEROGENEOUS DATA SOURCES

(75) Inventors: Edward Larue Stull, Brookeville, MD (US); George Lang, East Northport, NY (US); Robert John Lentz, East Hartford, CT (US)

(73) Assignee: Direct Computer Resources, Inc., Ramsey, NJ (US)

( * ) Notice: Subject to any disclaimer, the term of this patent is extended or adjusted under 35 U.S.C. 154(b) by 759 days.

(21) Appl. No.: 09/976,813

(22) Filed: Oct. 12, 2001

(65) Prior Publication Data

US 2007/0150562 A1    Jun. 28, 2007

(51) Int. Cl.
*G06F 15/173* (2006.01)
*G06F 1/00* (2006.01)
(52) U.S. Cl. .................................. 709/225; 345/522
(58) Field of Classification Search ............. 707/1–10, 707/119; 709/225, 200–203, 217–219
See application file for complete search history.

(56) References Cited

U.S. PATENT DOCUMENTS

| | | | |
|---|---|---|---|
| 4,714,989 A | 12/1987 | Billings ...................... 364/200 |
| 4,714,995 A | 12/1987 | Materna et al. ............. 364/200 |
| 4,769,772 A | 9/1988 | Dwyer ....................... 364/300 |
| 4,881,166 A | 11/1989 | Thompson et al. ......... 364/200 |
| 5,046,002 A | 9/1991 | Takashi et al. ............. 364/200 |
| 5,058,000 A | 10/1991 | Cox et al. ................... 364/200 |
| 5,142,470 A | 8/1992 | Bristow et al. ............. 364/184 |
| 5,161,158 A | 11/1992 | Chakravarty et al. ...... 371/15.1 |
| 5,239,577 A | 8/1993 | Bates et al. ................. 379/201 |
| 5,247,664 A | 9/1993 | Thompson et al. ......... 395/600 |
| 5,257,366 A | 10/1993 | Adair et al. ................ 395/600 |
| 5,278,978 A | 1/1994 | Demers et al. ............. 395/600 |
| 5,301,302 A | 4/1994 | Blackard et al. ........... 395/500 |
| 5,321,750 A * | 6/1994 | Nadan ........................ 380/230 |
| 5,345,587 A | 9/1994 | Fehskens et al. ........... 395/650 |
| 5,361,361 A * | 11/1994 | Hickman et al. ........... 715/705 |
| 5,381,534 A | 1/1995 | Shi ............................. 395/200 |
| 5,452,450 A | 9/1995 | Delory ....................... 395/600 |

(Continued)

OTHER PUBLICATIONS

Designing and evaluating a Web-based collaboration application: A case study, W Zhu—Usability evaluation and interface design: Cognitive . . . , 2001—lukew.com, p. 1-5.*

(Continued)

*Primary Examiner*—Beatriz Prieto

(57) ABSTRACT

System and method for data quality management and control of heterogeneous data systems. In a preferred embodiment, the system functions as a resource management tool that simplifies the process of managing data systems. More specifically, the system provides connections to source data systems, allows users to view data structures and enables simple management and manipulation of data contained within possibly heterogeneous data systems. The system utilizes an advanced graphical user interface, which allows users to access and manage systems using a simple point and click methodology. The system uses portals, which are tools that collect, visualize, analyze and directly edit data sets associated with different data sources. In another aspect, the system keeps track of its operational status, allowing users to automatically reproduce in one logon session work done in the previous session, without the need to replicate previous data analysis. Various additional features of the system and methods are disclosed and illustrated.

4 Claims, 19 Drawing Sheets

U.S. PATENT DOCUMENTS

| | | | | |
|---|---|---|---|---|
| 5,561,797 | A | | 10/1996 | Gilles et al. ............... 395/600 |
| 5,581,749 | A | | 12/1996 | Hossain et al. ............ 395/600 |
| 5,581,758 | A | | 12/1996 | Burnett et al. ............. 395/614 |
| 5,596,745 | A | * | 1/1997 | Lai et al. ................ 707/103 R |
| 5,630,124 | A | | 5/1997 | Coyle, Jr. et al. ........... 395/614 |
| 5,712,995 | A | * | 1/1998 | Cohn ........................ 715/792 |
| 5,737,539 | A | * | 4/1998 | Edelson et al. ................. 705/3 |
| 5,778,381 | A | * | 7/1998 | Sandifer ................. 707/104.1 |
| 5,790,120 | A | * | 8/1998 | Lozares et al. ............. 715/779 |
| 6,058,103 | A | | 5/2000 | Henderson et al. ......... 370/254 |
| 6,122,664 | A | | 9/2000 | Boukobza et al. .......... 709/224 |
| 6,259,679 | B1 | | 7/2001 | Henderson et al. ......... 370/254 |
| 6,301,590 | B1 | * | 10/2001 | Siow et al. ................. 715/500 |
| 6,332,163 | B1 | | 12/2001 | Bowman-Amuah ......... 709/231 |
| 6,370,573 | B1 | | 4/2002 | Bowman-Amuah .......... 709/22 |
| 6,434,563 | B1 | * | 8/2002 | Pasquali et al. .............. 707/10 |
| 6,581,054 | B1 | * | 6/2003 | Bogrett .......................... 707/4 |
| 6,583,798 | B1 | * | 6/2003 | Hoek et al. ................. 715/822 |
| 6,658,414 | B2 | * | 12/2003 | Bryan et al. .................... 707/9 |
| 6,721,747 | B2 | * | 4/2004 | Lipkin ......................... 707/10 |
| 6,728,700 | B2 | * | 4/2004 | Richards et al. ................ 707/3 |
| 6,754,672 | B1 | * | 6/2004 | McLauchlin ............ 707/104.1 |
| 6,799,198 | B1 | * | 9/2004 | Huboi et al. ................. 709/203 |
| 6,823,478 | B1 | * | 11/2004 | Prologo et al. ............... 714/38 |
| 7,017,183 | B1 | * | 3/2006 | Frey et al. ...................... 726/5 |
| 2001/0034605 | A1 | * | 10/2001 | Hoffman ........................ 705/1 |
| 2001/0047387 | A1 | * | 11/2001 | Brockhurst ................. 709/203 |
| 2002/0023045 | A1 | * | 2/2002 | Feilbogen et al. ............ 705/37 |
| 2003/0001875 | A1 | * | 1/2003 | Black et al. ................. 345/708 |
| 2003/0009564 | A1 | * | 1/2003 | Eckel ......................... 709/227 |

OTHER PUBLICATIONS

Using Information Portals in the Enterprise, White, Colin, dm Review, Apr. 1999.*

HP Distributed SmallTalk: A Tool for Developing Distributed Applications, Eileen Keremitsis, et. al. Apr. 1995, Hewlett-Packard Journal.*

Getting portals to behave, Olston, C. & Woodruff, A., Information Visualization, 2000. InfoVis 2000. IEEE Symposium,☐☐Oct. 9-10, 2000.*

International Search Report re International application No. PCT/US02/32044, dated Jan. 14, 2003.

Written Opinion re International application No. PCT/US02/32044, dated Sep. 17, 2003.

Arbee L.P. Chen, A localized Approach to Distributed Query Processing, Bell Communications Research, Piscataway, N.J., Mar. 26, 1990, pp. 188-202.

M. Rusinkiewicz et al., "Query Transformation in Heterogeneous Distributed Database Systems," IEEE, pp. 300-307, 1985.

T. Yu Clement et al., "Query Processing in a Fragmented Relational Distributed System: Mermaid," IEEE Trans. on Software Engineering, vol. SE-11, No. 8, pp. 75-810, Aug. 1985.

M. Rusinlaweicz et al., "An approach to Query Processing in Federated Database Systems," Proc. of the Twentieth Annual Hawaii Intl' Conf. on System Sciences, pp. 430-440, 1987.

S. Kang et al., "Global Query Management in Heterogeneous Distributed Database Systems," Microprocessing and Microprogramming, vol. 38, pp. 377-384, 1993.

* cited by examiner

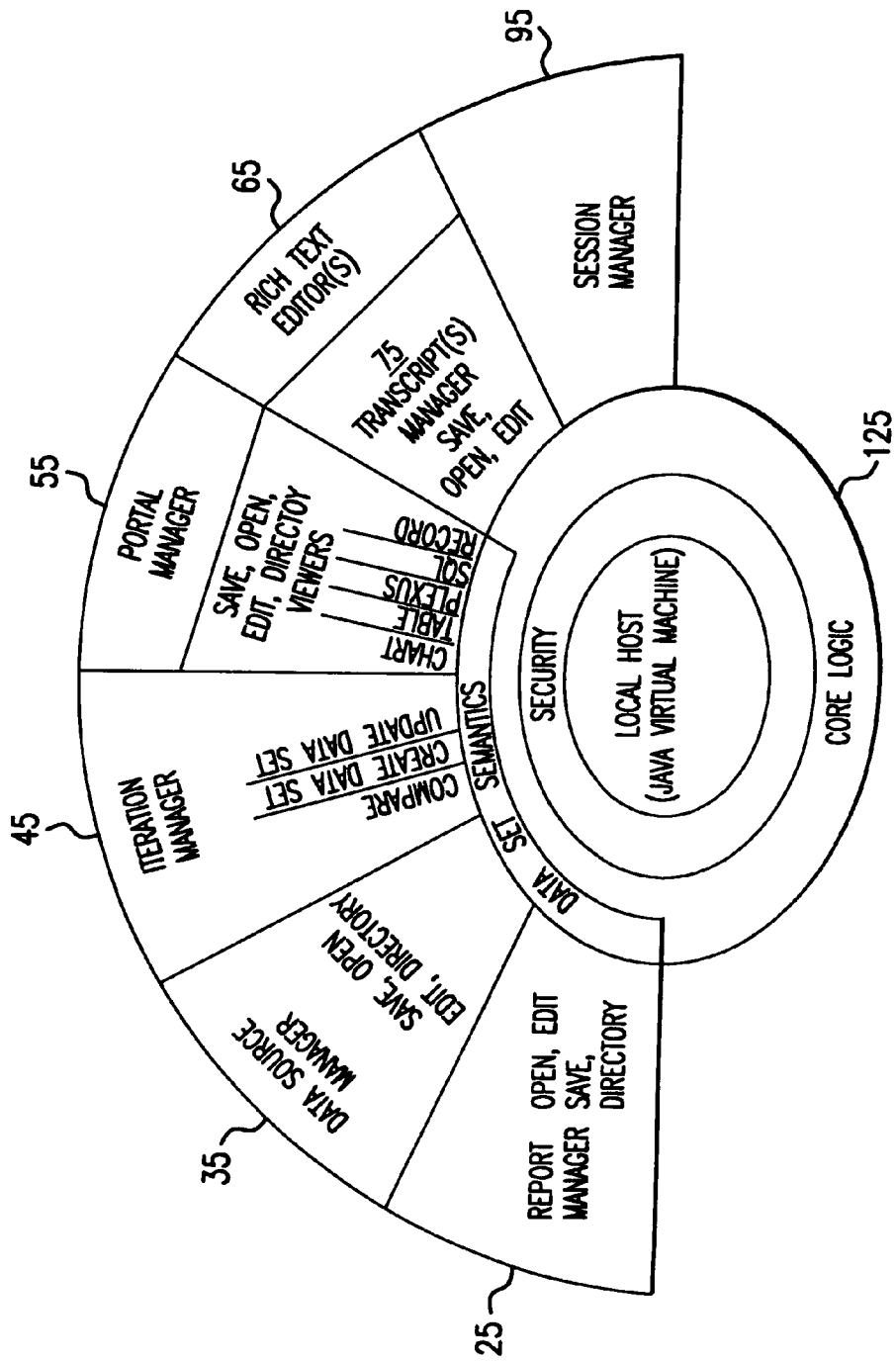

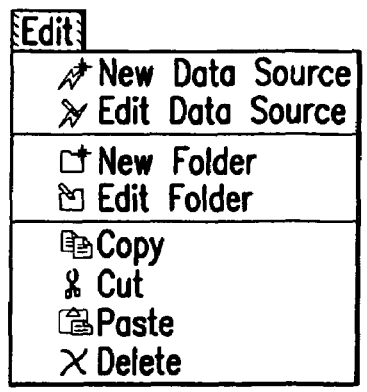
FIG.16
FIG.17
| Registered Portals | Name | Modified |
|---|---|---|
| ⊙ My Portals | My Portals | Tue May 01 11:08:5 |
| Other Portals | Other Portals | Tue May 01 11:09:1 |
FIG.18

| ☐ Registered Portals | Name | Modified |
|---|---|---|
| ⊙ ☐ My Portals | ☐ My Portals | Tue May 01 11:08:5 |
|   ☐ Other Examples | ☐ Other Portals | Tue May 01 11:09:1 |
| ☐ Other Portals | | |

FIG.19

| ☐ Registered Portals | Name | Modified |
|---|---|---|
| ⊙ ☐ My Portals | ☐ Other Examples | Tue May 01 11:10:3 |
|   ☐ Other Examples | ☐ Car Examples | Tue May 01 11:20:2 |
| ☐ Other Portals | | |

FIG.20

SYSTEM AND METHOD FOR DATA QUALITY MANAGEMENT AND CONTROL OF HETEROGENEOUS DATA SOURCES

1.1. FIELD OF THE INVENTION AND BACKGROUND INFORMATION

The present invention is directed to data management and data quality management and control and more particularly to a system and method that provide connections to source data, allow users to view data structures and enable management and manipulation of data contained within possibly heterogeneous data systems. A data system in this application is any system that contains data and provides management of this data. Data management refers more specifically to the management aspect of a data system. In common usage database systems typically refer to relational data systems, such as Oracle and DB2.

Data management and data quality management and control are essential to the operation of modern business and government entities. The establishment of a database, its day-to-day maintenance and data quality testing is a complex task, frequently assigned to specially trained operators or information system groups. The task of maintaining and testing databases is made especially difficult because of the existence of different database formats and the need for business, government and public interest entities running such different formats to cooperate effectively.

One reason for these difficulties is the current practice of developing separate test and management packages for different data systems. For example, if a company is operating an Oracle database, specific test and management software is typically developed with the intention of operating solely on the Oracle database. A similar process is undergone for each database being operated by a business, government or public interest entity. Since separate systems are developed and used for the maintenance of different data systems, operators of the differing systems must separately interface with the various data systems being managed and tested. The lack of a single interface capable of manipulating different data sources and formats in the prior art made this task highly time consuming and very often frustrating for operators.

To better appreciate the problem, it should be pointed that the applicable user environment is one of mixed technologies and mixed human operator skills. Due to the complexity of modern applications and tools it is frequently the case that Information Systems (IS) organizations can successfully train only one person to operate one or two applications or tools. As known, most software applications and tools are limited to only a few features, and thus IS corporate groups and organizations are forced to allocate a number of specialized users in order to support all applications required to run the business. Further aggravation stems from the cost of licensing and implementing each of the applications and tools, in addition to the high labor cost of training the operators.

It will be appreciated that the above problems fundamentally also involve issues of data quality management and control leading ultimately to the adequacy of quality assurance. Consider for example the problem of an organization developing a new inventory system with tracking features. Clearly, a major concern would be the accurate and reliable update of all forms of inventory information with respect to any particular inventory item processed through its life cycle. To ensure such accuracy and reliability, the developed application software is frequently run on test databases to avoid corruption of the operational data. After execution, the test data must be examined for errors. Error types can range from inconsistent data patterns to complete loss of data. Naturally, one has to be able to recognize the error(s) and then attempt to fix the underlying problem. A traditional technique for finding errors is to simply compare the resulting data to the original data. While merely identifying the presence of an error is relatively straightforward, many sophisticated analysis tools may be needed to discover the nature of the errors, and to do so quickly. In order to be commercially successful, such tools must require little concentration and effort on the part of the human operators—otherwise the tool's operation will interfere with the thought process of the operator and may lead to additional delays or errors. The above example is merely illustrative of the type of problems that exist in the data quality control and assurance context. Very few tools exist at present that even come close to satisfying the users' demands in this regard.

For helpful background information the interested reader is directed to the disclosure of the following patents: U.S. Pat. Nos. 4,714,989; 4,714,995; 4,769,772; 4,881,166; 5,046,002; 5,058,000; 5,142,470; 5,161,158; 5,239,577; 5,247,664; 5,257,366; 5,278,978; 5,301,302; 5,345,587; 5,381,534; 5,452,450; 5,561,797; 5,581,749; 5,581,758; 5,630,124, and printed publications:

Arbee L P. Chen, A Localized Approach to Distributed Query Processing, Bell Communications Research, Piscataway, N.J., Mar. 26, 1990, pp. 188-202;

M. Rusinkiewicz et al., "Query Transformation in Heterogeneous Distributed Database Systems," IEEE, pp. 300-307, 1985.

T. Yu Clement et al., "Query Processing in a Fragmented Relational Distributed System: Mermaid," IEEE Trans. on Software Engineering, vol. SE-11, No. 8, pp. 795-810, August 1985.

M. Rusinlaewicz et al., "An Approach to Query Processing in Federated Database Systems," Proc. of the Twentieth Annual Hawaii Intl'Conf. on System Sciences, pp. 430-440, 1987.

S. Kang et al., "Global Query Management in Heterogeneous Distributed Database Systems," Microprocessing and Microprogramming, vol. 38, pp. 377-384, 1993.

Attempts have been made to remedy aspects of the above problems by providing data management tools that are capable of operating across heterogeneous data systems. In this application, "heterogeneous data systems" are systems that are capable of operating simultaneously with differing multiple data systems. Examples of such data systems include DB2 produced by International Business Machines (IBM) Corporation, Oracle produced by Oracle Corp., Sybase produced by Sybase Inc., flat files and others. Such heterogeneous database systems, when used together, collectively also represent a heterogeneous, distributed data environment or system. Heterogeneous, distributed data systems are also sometimes called federated data systems or sometimes multi-database systems. At present, there is a need for convenient and reliable data-management system-independent software tools and methods capable of operating in multiple data system environments. Further, there is a need for such tools and methods for the purpose of data quality management and control. However, to the best of applicants' knowledge, none of the known prior art systems provide a robust system for data quality management and control of differing data system. It is the purpose of this invention to address the problems associated with the prior art and meet these and other users' needs.

1.2. SUMMARY OF THE INVENTION

In one aspect the present invention solves the above-identified problems and provides a distinct advance in the art using a data management system having access to a plurality of different data sources possibly entailing different data systems. In a preferred embodiment, the system comprises an interface providing connections to the data sources, and one or more controllers managing data access, analysis and visualization across data from the data sources. A data management system and associated service is provided, in which data from different data sources can be reviewed, manipulated or modified, and displayed, in order to understand the structure implications of that data or test its quality. In a preferred embodiment the system uses portals, which are tools that can access data from multiple sources, analyze the data and display it using a plurality of data viewers. A portal is typically associated with multiple data viewers, each being connected to a data source and displaying the data in a desired format, including facilities to manage the portal by, for example, saving and opening the portal. The portals used in accordance with this invention enable concurrent visualization and manipulation of data from different sources.

Accordingly, in one aspect the invention is a data management system, comprising: an interface connecting the system to one or more data sources; at least one facility linked to the interface for managing the one or more data sources; and at least one portal, the portal comprising a plurality of data viewers, each having access to a data source and being configured to perform analysis of data in the data source and displaying the results of an analysis. In various embodiments data sources may be remotely accessible via telecommunications network, such as the Internet, an intranet, an extranet linked to an intranet or others. In a preferred embodiment the system interface is connected to at least two data sources that operate under different data systems. Data sources may include one or more of the following databases: DB2, Oracle, Sybase, IMFORMIX, MS SQL SERVER, IMS, PDS, QSAM and VSAM or any combination thereof. The system interface in one embodiment comprises a data source controller configured to create, edit, organize, select, and delete connection specifications for said one or more data sources. In a preferred embodiment portal viewers may be one or more of: a plexus viewer showing data relationships using link-node style diagrams; a table viewer showing data in a table format; record viewer showing a row of data at a time, an SQL dialog and viewer for general SQL commands, and a chart viewer showing data in a chart format.

In another aspect, the system of this invention comprises a state-save facility that monitors and records the status of the system operations. Retaining the current system status makes the system simpler and more efficient to use, and in particular provides the ability to close a work session and then restore automatically the system status at the beginning of the next work session. This saves users the time necessary to recreate the individual data access and analysis settings. Also, because the records of the system status can be provided to other users, the state-save facility used in a preferred embodiment further enables sharing of data among different users. In specific embodiments, the state save facility includes processes for saving, restoring or sharing portal states. Similarly, save, restore and share data source specification processes are provided in alternative embodiments.

More specifically, in one aspect the invention is a processing method for use in a data management system comprising an interface connecting the system to one or more data sources and at least one portal having a plurality of data viewers, each data viewer having access to a data source and being configured to perform analysis of data and displaying the results of an analysis. The method comprises the steps of: monitoring and recording data source definitions used by each portal for data sources accessed in a work session; monitoring and recording the state of viewers associated with data sources accessed in the work session; closing of one or more portals in response to a user command; storing in a memory location of data source definitions and viewers' states that exist at the time when the closing command is received; and restoring the data source definitions and viewers' states from the memory location in response to a user command directing the opening of one or more closed portals.

In yet another aspect, the invention is a method for providing help information to a user, where by right-clicking a mouse when the cursor is positioned above a particular toolbar or menu icon the user is provided with help information related to the specific icon. In particular, the invention is a method for providing context sensitive help in an environment comprising toolbar or menu items, comprising the steps of: receiving input from a user directing a cursor of a computer mouse to a position over one of the toolbar or menu items; receiving user input corresponding to a click of the right button of the mouse; locating a help file associated with the toolbar or menu item being selected by the click; and displaying information from the help file to the user in a pop-up window located near the toolbar or menu item being selected by the click.

In another aspect, the invention is a data quality control method, comprising the steps of: a) selecting data from two or more data sets using specified selection criteria; b) comparing two or more selected data sets; and c) creating a data set of differences between the data sets being compared, wherein steps (a)-(c) are preformed using a graphical user interface (GUI) configured to display concurrently data possibly having different data formats and to initiate data analysis operations on a defined data set. Preferably, displaying data concurrently is performed using a portal comprising a plurality of data viewers, each having access to a data source and being configured to perform analysis of data in the data source and displaying the results of an analysis.

Other objects and advantages of this invention will become apparent from the following detailed description when viewed in conjunction with the accompanying drawings.

1.3. BRIEF DESCRIPTION OF THE DRAWINGS

FIG. 1 is a graphic image of a desktop in one embodiment of the present invention.

FIG. 1A is an illustration of a plexus viewer; FIG. 1B is an illustration of a Table viewer; FIGS. 1C-E are illustrations of chart viewers used in accordance with the present invention.

FIG. 5 is a representation of the system architecture in accordance with a preferred embodiment of the invention.

FIG. 16 is a graphic image of the Edit Menu for the Data Source Directory Controller.

FIG. 17 is a graphic image of the Toolbar for the Data Source Directory Controller.

FIG. 18 is an example of the lists that portray the Portal Directory and the contents of a selected directory folder.

FIG. 19 is an example of a list element that has been expanded in the Portal Directory.

FIG. 20 is an example of a Portal Folder that has been opened in the Portal Directory.

1.4. DETAILED DESCRIPTION OF THE PREFERRED EMBODIMENTS

Following is a description of preferred embodiments of this invention. It should be understood that the disclosed embodiments are merely illustrative of the invention, which may be embodied in various other forms that will be apparent to those of skill in the art. The description is organized as follows. First, an overall functional description of the system of this invention is made from the user's perspective. Several illustrations serve to help the reader appreciate the main features of the system, including its "look and feel." Following is a description of the main functional blocks of the system, and their interconnections in preferred embodiments. Brief introductions are provided to system components that in some cases may be known in the art, but may nevertheless be useful to support the overall system functionality. Finally, a detailed description is provided for novel system components and methods used in accordance with the present invention.

1.4.1. Overview of the System Structure and Functionality

The system in accordance with the present can be conceptualized as a resource management tool that simplifies the process of managing data systems, especially heterogeneous data systems that have different data definition and manipulation procedures, security procedures, system management approaches, capabilities, or other features. To this end, the system provides connections to multiple data systems, allows users to view the structure of these data systems, and enables management and manipulation of data contained within the data systems. In a preferred embodiment, the system of the present invention is capable of operating across multiple platforms, such as, OS/390, Windows NT, UNIX and others. Similarly, it can use any number of data systems including, without limitation, DB2, Oracle, Sybase, IMS, PDS, QSAM, VSAM and others. The system is especially useful for data quality management and control activities, such as data editing, comparing, analysis, creating new data sets, creating tests and migrating data and others, especially when data is extracted from a mix of legacy, flat-file and relational databases. In a preferred embodiment, these functions and activities are displayed using a graphical user interface (GUI) that allows users to access and manage systems using simple point and click operations.

Figure 1:
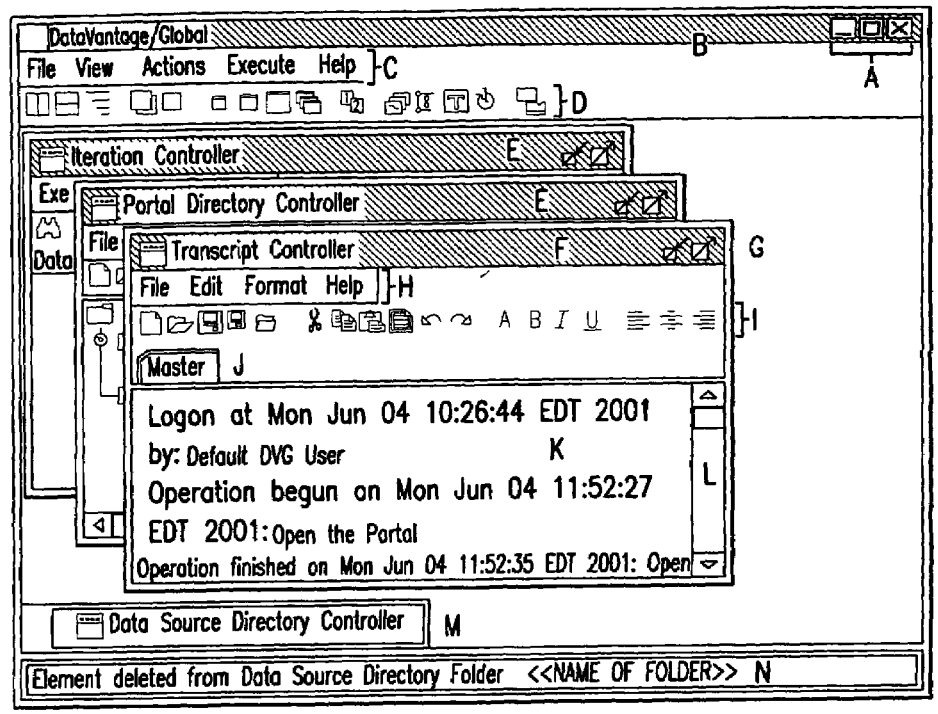

A brief explanation of basic GUI concepts and behavior, including those in accordance with this invention is in order. This explanation is not intended to be limiting in that other means or behaviors that achieve the same end can also be used. Central to utilizing the GUI is the mouse cursor. In the following description, to "click" means to position the cursor over a target element and quickly depress and release the left mouse button. The main components of a GUI in accordance with this invention are its frames. Frames are areas displayed on the monitor that contain information, graphics, or system dialog. A frame has a frame (border) that defines its boundary. In a preferred embodiment, the GUI of this invention utilizes a frame-in-a-frame technique. This approach allows all of the pertinent information to be contained in one place on the computer screen. With reference to FIG. 1, the main frame is the desktop, which is the highest level of the graphical user interface in a preferred embodiment. Generally, all aspects of the operation of the system are controlled by the desktop, which advantageously displays all related objects. Within the global desktop frame are other frames that may be opened simultaneously, as shown.

Several mechanisms are provided for the manipulation of frames in a preferred embodiment. For example, users can open frames by initiating a process, which may be a selection from a menu or an icon on a toolbar. Frames can also be closed and re-sized. In general, users can resize frames by placing the cursor on the frame, holding down the mouse button, and moving the mouse until the frame reaches the desired size. When the cursor is in the proper place to resize the frame it will change typically to a double-headed arrow. Frames can be also be moved by placing the cursor on the respective title bar, holding down the mouse button, and moving the mouse until the widow is placed in the desired position. Releasing the mouse button keeps the frame in position. Other features, such as minimizing, maximizing and exiting a frame (such as the desktop) are implemented in a specific embodiment using the conventional buttons shown as reference A on the top right corner in FIG. 1. In accordance with the invention, frames can be arranged in layers, which enables organizing the user's frames into logical work units. For instance, users can place all data for a particular project on one layer, which provides a simple and intuitive display of the relevant data when working on that project.

Frames can be active or inactive, as indicated by the color of the respective title bar. As shown in FIG. 1, the title bar of inactive frames (see reference E) can be gray. The title bar (see reference F) of a currently selected frame typically has a different visual appearance. To interact with the system a user must activate a frame, which can be done by clicking anywhere in the frame. In addition, frames used in a preferred embodiment generally have "minimize" and "maximize" buttons G, a menu bar H, a toolbar I, a tab J, a live area of the frame K, and a scroll bar L. A frame can be minimized (see M). In addition, in a preferred embodiment the system has a status bar N displaying a system status message. This bar can normally be gray, but it may change, for example, to yellow for an exception message or red for an error message. Additional features used in specific embodiments are generally known in the art and will not be considered in further detail.

Figure 2:
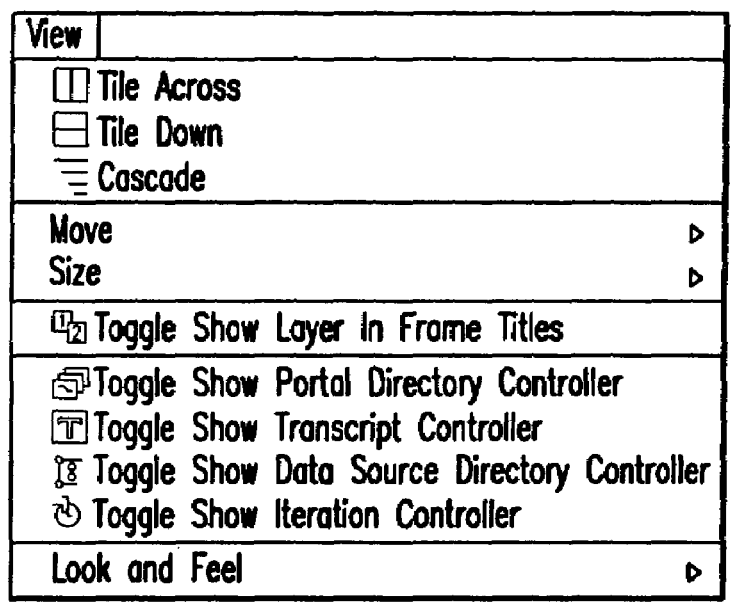
FIG. 2 is a graphic image of a top-level menu in a specific embodiment.
Figure 3:
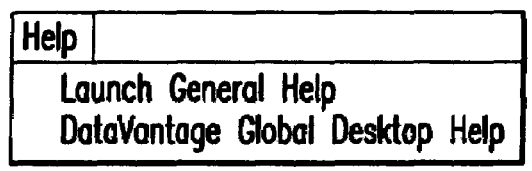
FIG. 3 is a graphic image of a sublevel menu in a specific embodiment.

With further reference to FIG. 1, directly below the title bar B in each frame is a row of text referred to as the menu bar C. Clicking on any of the words on will cause a "drop down" menu to appear. Selecting an option on the menu will either open another frame or execute a process. For example, the View Menu illustrated in FIG. 2 is indicative of other menus used in various embodiments, and provides menu access to the frame (i.e., window) arrangement facilities and to the system controllers. The following submenus may be used to arrange all frames in a specific embodiment:

1. Tile Across arranges the frames within the database (DB) Viewer across the frame horizontally;
2. Tile Down arranges the frames within the DB Viewer down the frame vertically;
3. Cascade arranges the frames within the DB Viewer diagonally, one on top of the other.

Preferably, the system of this invention has various submenus, each of which in turn may have further submenus.

Figure 4:
FIG. 4 is a graphic image of a toolbar in a specific embodiment.

With further reference to FIG. 1, below the menu bar, in a specific embodiment are placed multiple icons referred to collectively as the toolbar D. Positioning the cursor over any of the tool icons will cause a box with a description of the icon to appear. Clicking the icon will cause its function to execute. To view help information specific to each icon on the toolbar, in accordance with the preferred embodiment, the user can (right) click on the icon. A sample toolbar in accordance with the present invention is illustrated in FIG. 4. The appearance of the frames in a preferred embodiment can be modified to more closely meet the user's personal preferences using the "look and feel" selection from the View menu and selecting an option from the list. This menu selection can be modified to reflect users' preferences. In a specific embodiment, it comprises a Windows® standard look and feel style, a "motif" style look and feel that resembles the Unix® standard, or the Metal standard look and feel, which is a Java® standard.

Operationally, the system of the present invention uses a plurality of controllers that provide access to overall system functionality. Preferably, controllers appear by default as frames on the desktop, as shown in FIG. 1. The following controllers are used in a preferred embodiment:

1. The Portal Directory Controller is used to view data sources and perform analysis of data sets. Portals are where data sources and viewers come together, as explained below;
2. The Data Source Directory Controller controls connections to databases and data sets and is used to create, modify, an delete connections to databases;
3. The Iteration Controller is used to perform actions and operations upon one or more data sets, including, for example, comparing data sets, creating test data sets and aggregation;
4. The Transcript Controller provides a record of actions performed in the system and a facility for executing commands. Transcripts are used in accordance with the present invention as a workspace for creating and executing commands, as well as for documenting work that has been performed.

These controllers are described in further detail below.

Figure 1A:
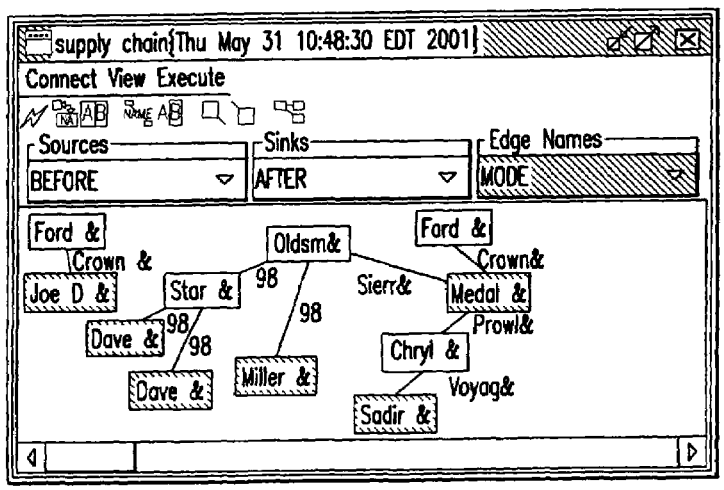
Figures 1B, 1C:
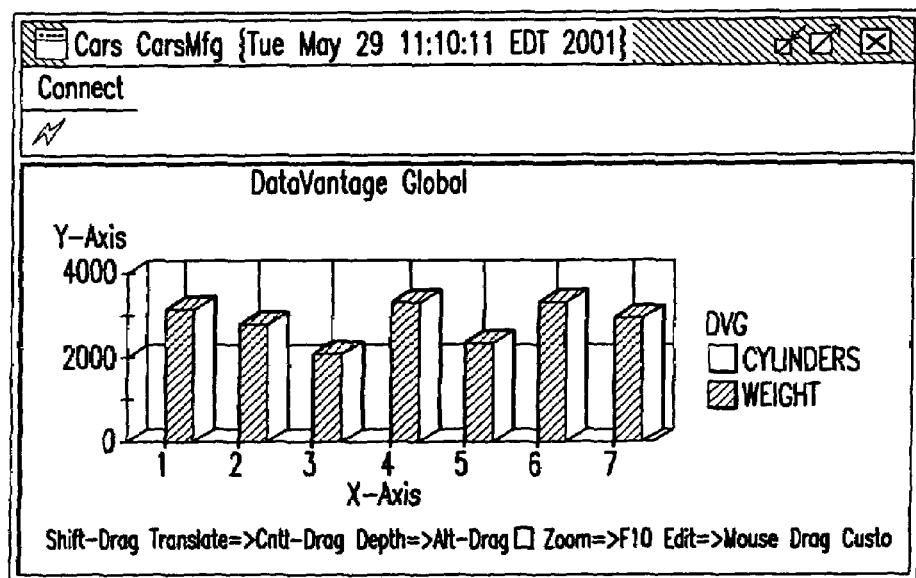
Figure 1D:
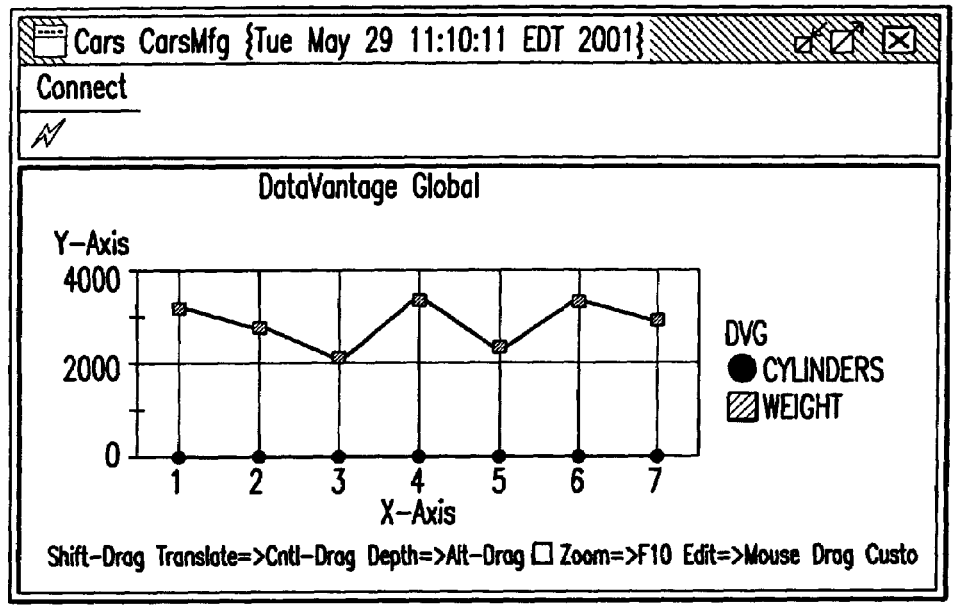
Figure 1E:
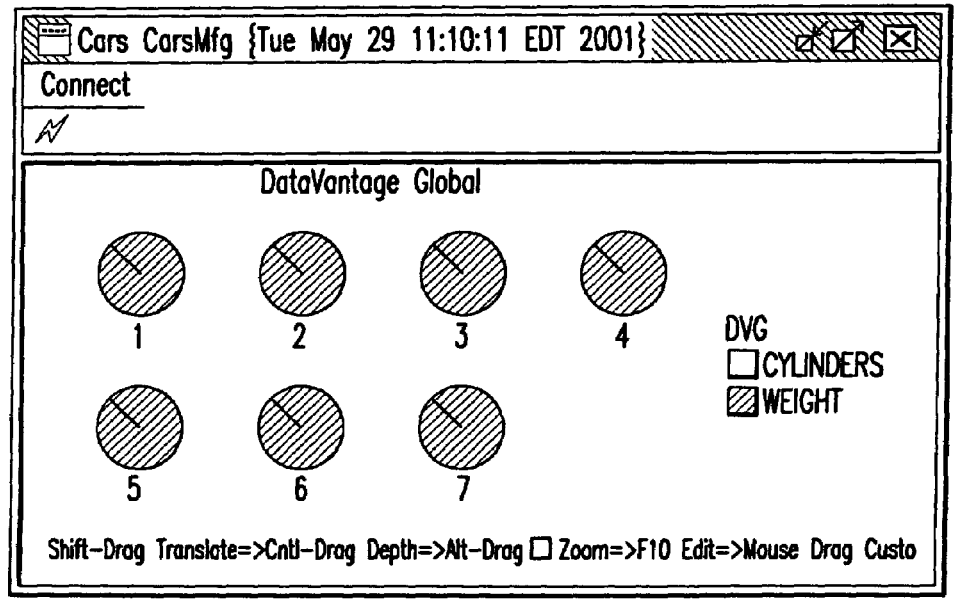

An important aspect of the present invention is the ability to view data and data relationships in different ways. By way of illustration, in accordance with this invention data can be viewed in one or more ways using the following viewers:

1. The Plexus Viewer is used to show relationships in the data, especially in cases when these relationships are difficult to display in the traditional raw-and-column format. To this end, the plexus viewers uses link-node style diagrams to show the relationships, including missing or superfluous relationships, as illustrated in FIG. 1A. To display a Plexus Viewer, users may first select the data source in the Data Source Directory Controller, next use the Portal Directory Controller to open a portal for the selected data source, and finally use the New Plexus Viewer button. In a preferred embodiment, relationships between data are illustrated using "rubber-band" links that automatically re-adjust the links even if different data objects are moved using the GUI.
2. The Table Viewer is used in a preferred embodiment to show data in a table format, where each data item (datum) is placed in a cell, and cells are arranged horizontally and vertically. Cells may represent data in two-dimensions or in a nested tree structure. The Table viewer is sometimes called a Grid Viewer. It is useful for browsing detailed data, and in particular may illustrate parent-child relationship between data. The hierarchical display capabilities of the table viewer are indicated visually to the user by the familiar plus/minus signs. An example of a hierarchical Table Viewer used in a specific embodiment is shown in FIG. 1B. This example also illustrates the capabilities of the system to work across data platforms. For example, while the parent row in a table viewer may be a flat database, the child row may be a DB2 database. In a preferred embodiment, the system allows direct editing of the data in the table cells.
3. The Chart Viewer is used in a preferred embodiment to display data in a chart format. This viewer enables viewing the data graphically in various formats, including bar chart, plot chart, pie chart and others, as well as colors and other attributes. This viewer is handy for evaluating the validity of data. For example, database IDs may be viewed in a Bar chart. In this format, one can readily see gaps in the sequence of the IDs or negative numbers, which may indicate an invalid ID. Different examples of a Chart Viewer are shown in FIGS. 1C-E.

It will be appreciated that the basic user paradigm for viewing and editing data in accordance with the present invention is:

1. Indicate the data source to use. In a specific embodiment the data sources available to the system, are defined as registered data sources, which are illustrated in the Data Source Directory Controller frame as organized connections to data systems and data sets. Example data sources include DB2, Oracle, Text, "mixed" or other data sources, dependent on the user's access privileges.
2. Indicate the manner of presenting the data. The user may select different viewers in order to present the data;
3. Present the data. As indicated, viewers used in accordance with the present invention, such as the plexus, table, chart, record, SQL and others viewers enable different formats in which data can be presented to a user.

The specific mechanisms for performing these functions are discussed below.

In summary, the system of the present invention is directed to data source management that bridges multiple differing technologies, and may involve complex data relationships. As shown below, the system is especially suitable for data quality control and testing. From the user's perspective, an important advantage of the system is that it is configured to record all setup information for a particular data analysis even after a particular viewer or portal is closed. This enables the system to re-create automatically the work environment that existed at closure time. Further, records of the system setup provide a simple mechanism to enable sharing of the data with other authorized users.

The requirements for implementing the system of the present invention may vary, but in general include:
1. a Java Virtual Machine (JVM), Java Development Kit (JDK), Java Runtime Environment (JRE), or Native Compiler for Java;
2. A compatible Database Management System (DBMS);
3. Java Data Base Connectivity (JDBC) driver classes or Open Data Base Connectivity (ODBC) drivers for the DBMS;
4. Graphic User Interface (GUI) support, i.e., Windows, OS2, Xwindows, X11 emulation, and others;
5. Connectivity to a host machine (preferably TCP/IP);
6. Administrative rights to create directories and install software;
7. Security access to data systems;
8. Appropriate hardware to read and load the system, including, for example, CD-ROM and tape drive, and others;

Most of the above components are generally known in the art and except to extent they pertain to novel features of the invention will not be discussed in detail.

1.4.2. System Architecture

FIG. 5 depicts in a diagram form the major system components and their interfaces in accordance with a preferred embodiment of the invention. It should be apparent that the figure is merely illustrative and cannot capture the complete functionality and component interconnections of the system of this invention. For example, there are cases (such as the set of objects which are responsible for printing) in which certain of the objects in any one of the system components interface with multiple objects that need not be part of the adjacent system components shown in the figure. The term object is used here in the context of object oriented (O) programming and, although it evades a simple definition, is well known in the art. (One possible definition is that an object is a unit of structural and behavioral modularity that has properties). A description of the individual system components illustrated in FIG. 5 follows.

1.4.2.1. Report Manager

With reference to FIG. 5, the Report Manager 25 used in accordance with the present invention serves to collect data based on a prescribed query, as well as to arrange the data and then present it in a prescribed form. In a preferred embodiment, the final product of this manager is a paper report.

The arrangement, summarization and presentation of data by the Report Manger 25 provide support for both textual and graphical presentation. For example, data could be presented in a pie-chart form, while also being presented in a two-dimensional table. In general, tools of this type are known in the art and need not be discussed further. In a specific embodiment, a Report Manger in accordance with the present invention can be implemented using "Crystal Reports" by Crystal Decisions, Scotts Valley, Calif., or "Actuate" by Actuate Corporation, South San Francisco, Calif.

1.4.2.2. Data Source Manager

In a preferred embodiment, data collection in the system of this invention is done using a Data Source Manager 35. The Data Source Manager generally handles the specifications for a query after entry and validation. In addition to conventional filters, such as "WHERE name='Bill'," such query specifications may include in a preferred embodiment the use of virtual columns, summary elements and columns, grouping and sorting, data driver (i.e., seed) tables and others.

In general, the system of the present invention is based on the well-known Model-View-Controller (MVC) approach. Essentially, the goal of the MVC design is to separate the application object (model) from the way it is represented to the user (view) from the way in which the user controls it (controller). Briefly, the model object knows about all data that has to be displayed and the operations that can be applied to transform that data. The view object refers to the model. It uses the query methods of the model to obtain data from the model and then displays the information. The display can take any form, but different displays have no bearing on the behavior of the data object. The controller object knows about the physical means by which users manipulate data within the model. In a GUI, for example, the controller object would receive mouse clicks or keyboard input, which it would translate into the manipulator method that the model understands.

Figure 5A:
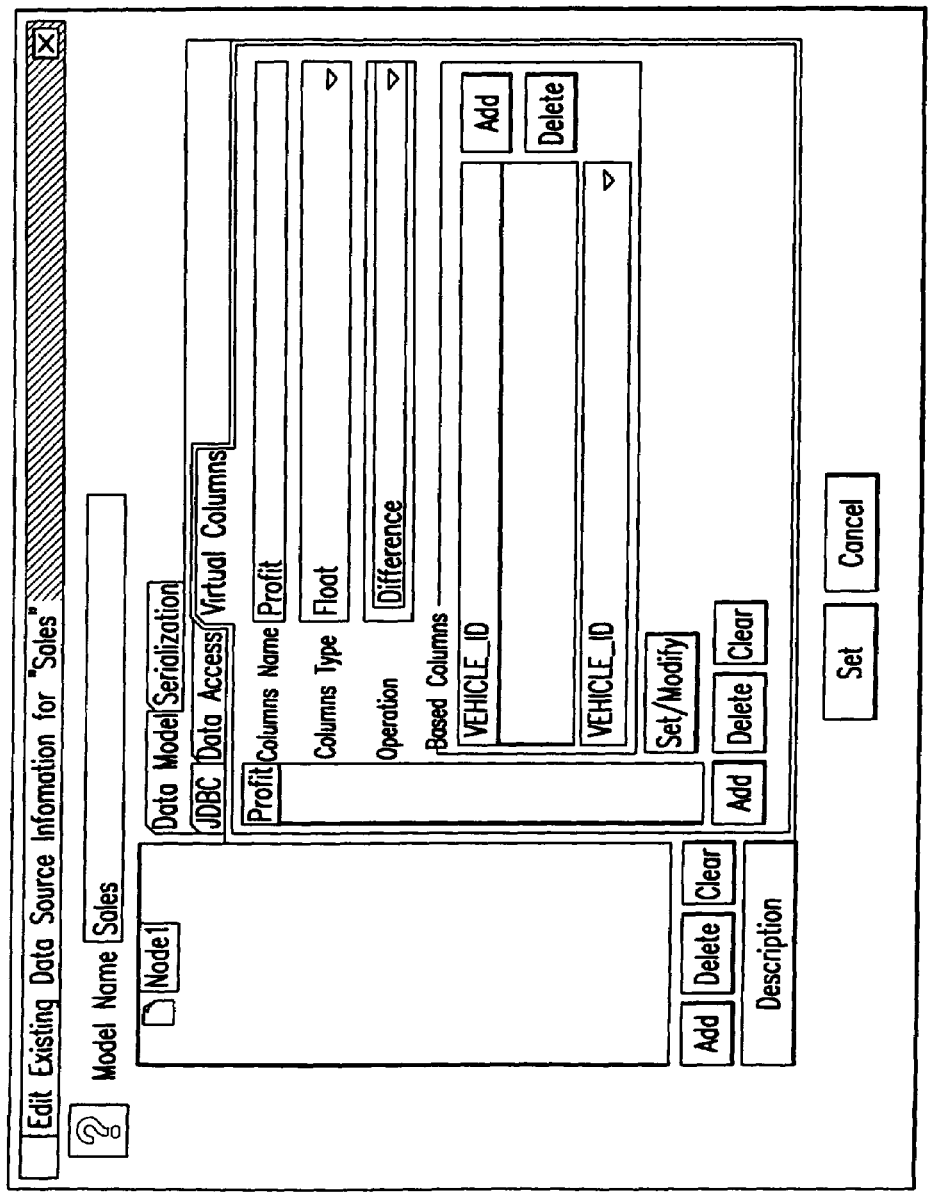
FIG. 5A is an illustration of the Data Model dialog box in a specific embodiment of the invention.

In this case, a data model is used in a preferred embodiment to connect the system to a data source and to define the connection. As shown in FIG. 5A, sample Data Model dialog may have the following tabs: a JDBC tab, a Data Access tab and a Virtual columns tab. The JDBC tab enables users to attach to a database and define the queries associated with a node. (In the context of this invention, a node creates a connection to a data source. Multiple nodes can be used to create a hierarchical tree. The topmost node is the parent node and all nodes below follow as children. An added node can use the parent connection, which is the default setting, or may be connected to other data sources.) The JDBC tab in a specific embodiment is used to connect the system to a data source and to define the queries in the connection. The JDBC tab may have sub-tabs, such as a "connections" tab, which defines data source information; and SQL query tab, which tab defines queries against the data source.

The Data Access tab in a specific embodiment is used to set and manage the overall commit policy and the access rights to data sources. Updating a database generally involves two steps. The first is to insert, modify, or delete the data. The second is to confirm the updates by committing the data to the database. A variety of commit policies may be enabled and presented to the user in a pull-down menu. Such policies include updating all records changed in the current connection, updating the current record viewed in a viewer, or others, as known in the art.

The Virtual columns tab is generally used to create computed data, which may then be utilized as normal data. Suppose for example that the system user is a car dealer who wants to determine if his cars are being sold at a profit. To this end, the user can create a virtual column named "Profit" to calculate the difference between the sales price and the dealer cost for each "VEHICLE_ID." This column could then be used in a select statement to display cars where the profit is substantially above average, less than zero, or has values in a predetermined range. As illustrated in FIG. 5A, in a preferred embodiment the user can create a virtual column and give it a meaningful name (in this case "Profit"). Next, the type of data in the column can be specified. In a preferred embodiment the user can select one option among a group of options including, for example, "Boolean," "decimal," "float," "integer," "object," "string," or others. In this example the column type for the virtual column "Profit" is "float." In the next step, the user will be given a number of options specifying the desired operation. Such operation could be any one of "min," "max," "average," "sum," "difference," "product," "quotient" or others. In this example the selected operation is "difference." Finally, the user will specify the "Based columns," i.e., the columns on which the calculation will be based (in this case the column VEHICLE_ID). The virtual column information can then be stored by pressing the "Set/Modify" button, which makes the virtual column usable.

The Data Source Directory Controller views illustrated in FIG. 16 and FIG. 17 visualize the Data Source Manager 35 in accordance with the MVC approach. In a preferred embodiment, the Data Source Manager can manage a potentially very large number (i.e., thousands) of objects and their state parameters about any data source.

Data Source Manager 35 is one of a number of service managers that are part of the overall system in a preferred embodiment. It maintains and applies, such as in a query, possibly thousands of specifications about the query abstraction and its state. Over a long period of time that an individual user may work with the system (including generalized services that a client organization may offer to its users), a large numbers of sources of data are expected to accumulate. Indeed, the number of these data sources may become so large that naming conventions, as well as the ability of a user to remember all of them can fail. Therefore, the Data Source Manager 35 manages each data source specified by the user. Preferably, the Manager 35 does this through a hierarchical directory that may be arranged arbitrarily by the user dependent on the current work projects. Advantageously, the whole directory or any data source within the directory may be made persistent (i.e., retain information from one load to the next), shared with other system users, and restored the next time a user logs into the system to the system state in which it was closed. Further, a previously saved directory may be reloaded by a user or shared with another user. Thus, it is possible to interchange directories, for example, based on work projects. The system of the present invention also updates the directory automatically, for example, when generating the results set to compare two or more data sources or in the dynamic creation of data sets.

In general, resource management tools are known in the art and need not be discussed further, although specific aspects of their implementation in the system of this invention are believed to be novel and will be described below. Examples of prior art resource managers include the Active Directory in Windows 2000 and the Directory Access Protocol by the International Standards Organization.

1.4.2.3. Iteration Manager

The Iteration Manager 45 of the system generally provides a facility that enables certain user actions to be applied to more than one data source. For example, a user may need to extract data from multiple data sources and in turn place extracted data in one or more data sources. Typically, in the course of research a user will begin with a single point in a problem space. As the user's understanding of the problem changes, he may refine the problem space by adding to or removing elements of the problem space. For example, a user may begin with a data source that contains the physical parts in an inventory, and then subsequently consider the relationships among those parts and also the suppliers of assemblies of these parts. Here, the problem may be to find suppliers that could offer manufactured parts that are essentially assemblies of other parts that are available. However, if more than one assembly is to be considered, the same problem solving approaches must be applied to more than one assembly. Accordingly, the system of the present invention offers several iteration functions, such as comparing data sources, searching and replacing values, and extracting data sources to other data sources. Iteration managers that can be used in the system of this invention include implementations of a frequently used software pattern, wherein one function is applied to one or more data structures. Iteration manager implementations are generally known in the art and will not be discussed further.

1.4.2.4. Portal Manager

Figure 13:
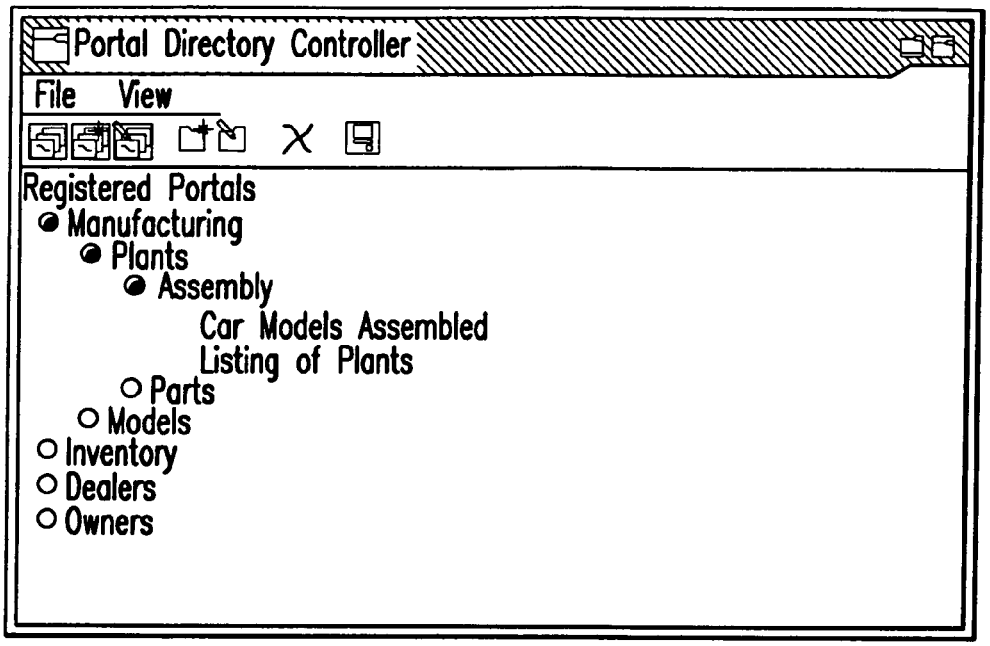
FIG. 13 is an example of a Portal Controller frame with sample data.
Figure 14:
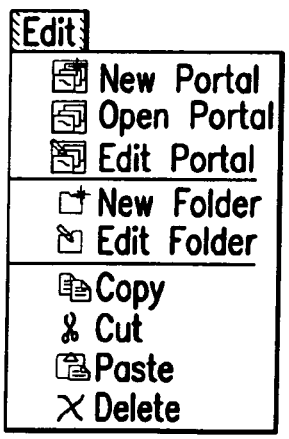
FIG. 14 is a graphic image of the Edit Menu for the Portal Directory Controller.
Figure 15:
FIG. 15 is a graphic image of the toolbar for the Portal Directory Controller.

In light of the model-view-controller approach, the Portal Manager 55 used in accordance with the present invention is visualized by the Portal Directory Controller frame view, illustrated in FIGS. 13, 14 and 15. The model is that the Portal Manager maybe managing potentially thousands of objects and their state parameters about every portal. In accordance with the present invention, portals are tools that organize data analyzes and manipulations of data sources. In the system of this invention portals generally consist of a group of data viewers used to browse, view and edit data. As noted above, in a specific embodiment viewers may be table, chart, plexus, SQL, record viewers, or other viewers. Each viewer is connected to a single data source. Portals are used in the system of this invention to organize viewers and to create collections of data analyses. In this way, users can have portals that have a purpose, such as testing database applications. In a preferred embodiment, a portal can be created for each type of analysis. When users access the portal, the underlying viewers are connected to the data and are ready to perform the requested analysis.

Portals in the context of this invention have two main features. One is that they are comprised of a plurality of viewers with their respective views and the associated models. The second is that they are manageable, i.e., they can be created, opened, saved, shared, merged and destroyed. Merging of portals in the context of this application means that viewers of one portal are added to another portal. A viewer has both one or more view objects and one or more model objects. A viewer is a basic element of data analysis, wherein results from a particular data analysis are managed and viewed. For example, a Chart Viewer may be used to display trends in a data set. Additional details on portals are provided in Section 1.4.3.

1.4.2.5. Rich Text Manager

The Rich Text Manager 65 in accordance with the present invention provides extended text services for formatting textual data. Such services in a preferred embodiment include:

1. Font manipulation such as font size, family, italics, bolding, and color;
2. Embedded graphics for pictures and figures;
3. Text flow control for paragraphs and embedded graphics; and
4. Text editing These services are used for support to message creation and formatting, and for the creation, formatting and editing of the transcripts provided by the system of this invention. Rich Text Mangers are known in the art (for example, Microsoft Word) and will not be described further.

1.4.2.6. Transcript Manager

The Transcript Manager 75 used in the system of this invention generally records user actions and basically provides a log of the system operation. Preferably, this Manager also provides multiple concurrent transcripts, rich text editing, and embedded graphics. Further details are provided in Section 1.4.7.

1.4.2.7. Workflow Manager

Java technology provides basic serialization facilities for individual runtime objects to be made persistent. However, additional services are required to capture all data to effectively save work in progress or completion, such that the information can be restored and shared in an open environment. In the system of this invention the Workflow Manager provides such functionality. The Workflow Manager is not illustrated in FIG. 5, because it is a collection of services that are integral to one or more other services. The Workflow Manager generally saves and restores facilities and provides for sharing of these facilities among users. The Manager may optionally provide merging shared resources into an existing environment. Further description of this Manger is provided in Section 1.4.4.

1.4.2.8. Session Manager

The Session Manager 95 in accordance with the present invention handles services needed for managing a user session. Generally, these include the logon and logoff services, task initiation and termination services, and providing data statements about the running session or sessions. These services are generally known in the art and will not be discussed further.

1.4.2.9. Core Logic

The Core Logic 115 used in the system architecture in accordance with a preferred embodiment is a collection of low-level services implemented through objects. Both specialized and general-purpose objects may be implemented. Generally, the Core Logic provides the following services:

1. Utility Services—such as the "Right Click for Menu and Tool Bar Help" discussed below.
2. Data Set Services;
3. Security Services—The system of the present invention generally interfaces to and uses by design the general security services of the operating environment possibly augmented by third party support.
4. Event Services—The system of the present invention extends the event services provided by the Java Virtual Machine. Generally, the system of the present invention conforms to the so-called Model-View-Controller (MVC) model. In this system, the event model is extended to promote loose coupling among hundreds of model objects and similarly among hundreds of view objects. In many cases, view objects of the system have additionally specialized view models objects, which are aggregates and adapters to the general model objects in accordance with the invention.
5. Security services—These are security services, such as user ID and password management.
6. Local Host Services—These services provide an interface to those externally available services implemented by the computing host.

1.4.2.10. Applications Overview

Figure 6:
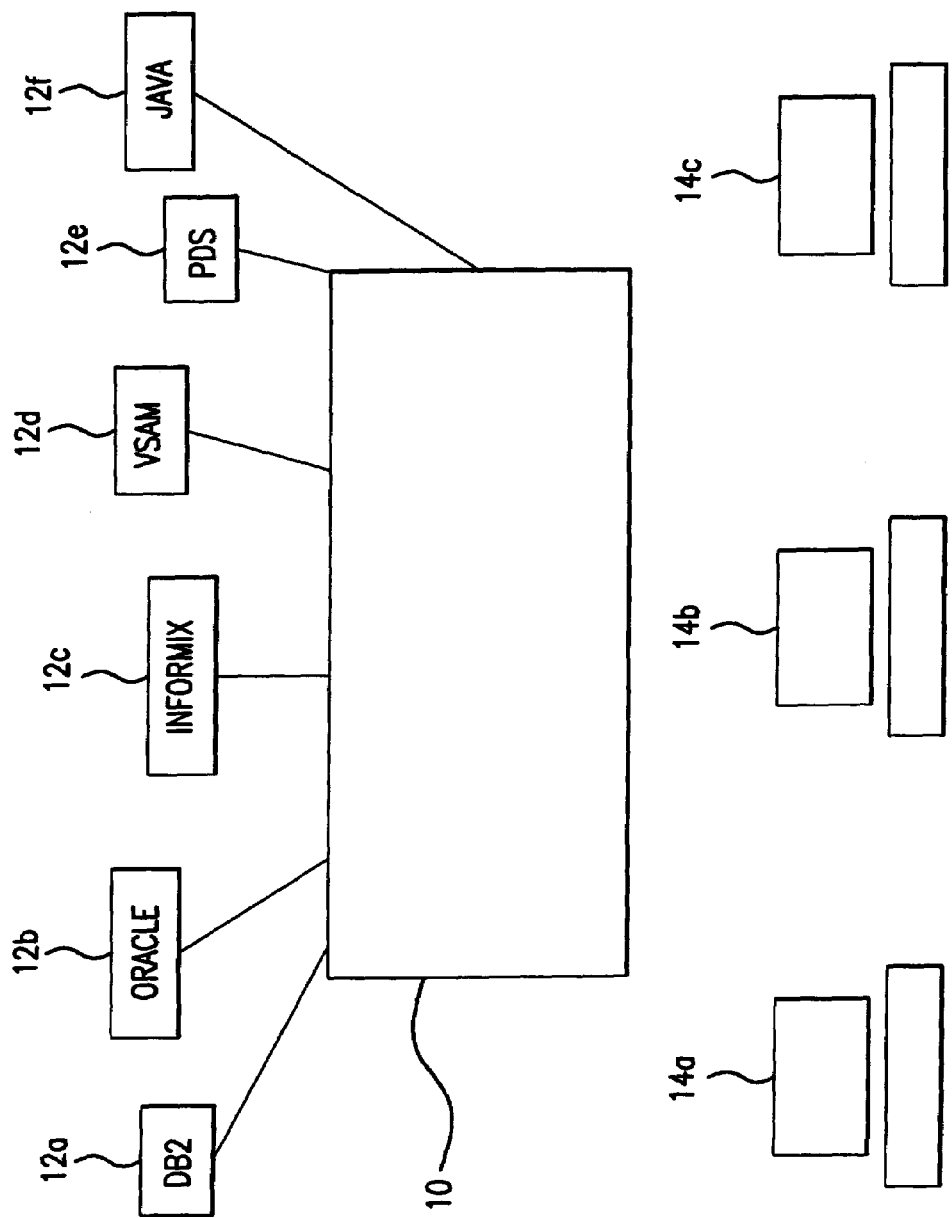
FIG. 6 is a conceptual perspective of operating in a multiple data store environment in accordance with a preferred embodiment of the present invention.

In view of the above and with reference to FIG. 5 and FIG. 6, the system 10 of this invention generally enables users to view and edit data retrieved from multiple databases 12*a-f*. In a particular embodiment, the users may view and edit data from the same data source at the same time on their screens 14*a-c*, because the system provides services for the concurrent manipulation of data. (Such concurrent manipulation services are known in the art and need not be described). The present system 10 allows users to gain quick access to data, which can be manipulated intuitively and can easily be shared among a group of users. In addition, the system 10 provides a new tool to turn questionable data into reliable data by providing the capability of running concurrent data quality tests and displaying the results in a format most meaningful to the operator.

The system 10 further offers applications in the realm of business intelligence and data mining, allowing users to simultaneously view and edit data from multiple databases on one screen. Corporate users may employ the information gathered through the system 10 to support their strategic directions, define approaches to sales and marketing, and other areas where having a fully integrated understanding of their data can be essential. In addition, system 10 provides an integrated report generator capable of translating data analysis into easy-to-share information that can be provided to multiple users in convenient form.

In general, the system 10 is capable of accessing multiple databases, or data sources, at the same time. In particular, it allows users to manipulate and compare various databases, such as DB2 12*a*, Oracle 12*b*, Informix 12*c*, VSAM records 12*d*, PDS members 12*e* and Java source files 12*f* through the utilization of a single system. While specific database structures are listed above for the purpose of describing this invention, those skilled in the art will appreciate the wide variety of database structures that may be used in accordance with this invention. In addition, the system 10 simultaneously displays, manages and makes real-time changes in the various databases 12*a-f*, which may be viewed and edited in different visual formats.

The system 10 of this invention further offers charting, spatial displays and hierarchical tables, while allowing the storage and retrieval of complex previously created test environments (including frequent tasks and work in progress). As discussed below, the interface formats that are offered through the system 10 provide ease of use and intuitive operation.

The system 10 also allows users to combine different database queries into a single query. Notably, prior art systems only permit the querying of a single data system at a time and thus may require several separate queries for each of the separate data systems that may be used for a given project. By contrast, the system 10 of the present invention enables a single query to be used across multiple data systems using portals running iteration, as described, for example, in Sections 1.4.4. and 1.4.5. below. In addition, the present system 10 does not require the preparation of multiple programs to connect data, because the data from multiple databases 12*a-f* appears simultaneously on the graphical user interface and may be edited, analyzed, updated or modified concurrently. In addition, the system 10 allows an operator to create, store and reuse complex queries without the need to store large test files, or adhere to a work schedule committed solely to one testing project. This allows the operator to leave work for an hour, an afternoon or even weeks on end, without losing any analysis. The work is simply picked up at the stage where it was left off.

Further, the system 10 makes it possible to update data from disparate systems and platforms into one relational table on a single screen. The system further allows the data management and testing tool to update all data residing on this one screen, thus allowing the operator to control data from disparate systems at the same time. The present system 10 is one product doing the tasks of many and ultimately streamlines the business process, simplifying product management, installation and training. These and other objectives are achieved in accordance with a preferred embodiment by providing a system 10 offering cross-platform operation capability. To this end, the present system 10 is completely Java-compatible and includes Java architecture. Specifically, the system employs Java Database Connectivity (JDBC), allowing the system to interact with a very wide range of data systems, and enables a wide array of functions improving the operator's ability to manipulate, create and analyze data sources.

JDBC technology, which is used in a preferred embodiment, is generally known in the art. The reader is directed to the documentation listed, for example at http://java.sun.com/products/jdbc/index.html, which is available at the time of this application filing, and is the most detailed source of information about JDBC technology known to the inventors. To use the JDBC technology with a particular data management system, generally developers need a JDBC technology-based driver to mediate between the JDBC technology and the data system. A driver might be written purely in the Java programming language or in a mixture of the Java programming language and Java™ Native Interface (JNI) native methods. Details about the development of the particular drivers are beyond the scope of this disclosure, but it should be noted that the JDBC web site maintains a list of vendors with drivers currently available or under development.

1.4.3. Data Quality Control and Assurance

Some of the main applications of the system of this invention are for data quality control and assurance. Many aspects of such applications will be apparent to a person of skill in the art based on the foregoing description and the discussions in sections 1.4.4 to 1.4.7 below. This section describes, from the user's perspective, the main steps that are involved in a typical application.

It will be appreciated that data quality management and control generally involves selection of data sets and manipulating the selected sets in a predetermined manner to reach conclusions about the data. Thus, in one aspect this invention is a data quality control method, comprising the steps of: a) selecting data from two or more data sets using specified selection criteria; b) comparing two or more selected data sets; and c) creating a data set of differences between the data sets being compared, wherein steps (a)-(c) are preformed using a graphical user interface (GUI) configured to display concurrently data possibly having different data formats and to initiate data analysis operations on a defined data set. In a preferred embodiment, displaying data concurrently is performed using portals, as described above.

In another embodiment, the invention is a data quality control method, comprising the steps of: a) selecting data from one or more data sets using specified selection criteria; b) creating at least one new data set from the selected data; c) modifying the created at least one new data set to represent conditions required to test an application program; d) comparing one or more modified data sets to a reference data set; and e) creating a data set of differences between the modified and the reference data sets, wherein steps (a)-(e) are preformed using a graphical user interface (GUI) configured to display concurrently data possibly having different data formats and to initiate data analysis operations on a defined data set.

In a preferred embodiment, the steps of selecting data from production or other data sets involves using random or specific selection criteria. To create a test set, the first step generally is to define fields/columns that make up the records/rows in the user's data system. In a preferred embodiment this can be done using the option "create test set" in the iteration controller. The create test set option provides a variety of options for selecting test data from an existing data set. These options enable the user, for example, to copy all data, or to specify different data sampling conditions. Regular data sampling conditions used in a specific embodiments include, for example, the selection of M continuous rows in a data set, the selection of every N-th row, or others. Random data sampling is also provided in a preferred embodiment. SQL-type conditional expressions can be used in a preferred embodiment to create the desired test set. For enhanced organization and retrieval of the results, the user is provided with a variety of test set naming options, including prefix/suffix data, date and time of creation and others. The created data test set is recorded in the iteration controller and is made available to the user in a separate frame for analysis. It will be appreciated that the method of this invention need not use newly created data test sets, but rather may operate on existing data. Data operations that involve data comparison typically require the definition of a baseline data set, which serves as a basis for the comparison. The baseline data set is then compared with the test data set to create a data set of the differences. In a preferred embodiment, saved test data sets can be refreshed at any time or, if the data is altered after a program is tested, one can refresh sets to their original version.

Testing of programs also involve running the program on a test data set and comparing the results to expected results. Because running a program may affect the data in a user's database, the system of this invention provides facilities to compare results between 'before' and 'after' version of the databases, to save and refresh the altered database, and to browse and modify the database. For example, data in two different sets can be compared using a selection of a drop-down menu option. Different comparison operations may be used in specific embodiments. These operations can be done over all of the data columns, select data columns or using other criteria. In a specific embodiment, test data is compared to data in a reference set, which may simply represent previously available information. Execution of the data set comparison operation causes the system to check the data sets against the specified comparison criteria and create a new data set. Comparison results in this new data set are then displayed to the user in a desired format. For example, columns for which no match has been found can be displayed as empty columns. Data match or mismatch can be illustrated using color conventions.

In other applications, it may be necessary to perform data analysis and comparisons where multiple data systems exist on different platforms or on several databases. Such comparisons are made simple using the system of the present invention, which enables showing multiple structures in side-by-side windows. In addition, different viewers of the system enable the user to visualize data through a variety of graphical presentations. The system enables simple data migration from one database or legacy file structure to another by using several mouse clicks. Errors in data can be identified and then corrected using graphical link-node diagrams or charts.

In the following description, several specific aspects of the invention are discussed in more detail. In particular, with reference to FIG. 6, FIG. 7 and FIG. 8, several concepts and their services for data quality control are disclosed in the following sections. These include: the concept of a portal and its service used for managing data quality control work; a workflow concept and service used for saving, restoring, sharing and merging of data quality control work; a transcript concept and service used for managing the logging, editing and reporting of data quality control work, and others.

1.4.4. Portal Concept for Managing Data Quality Control Work

Figure 7:
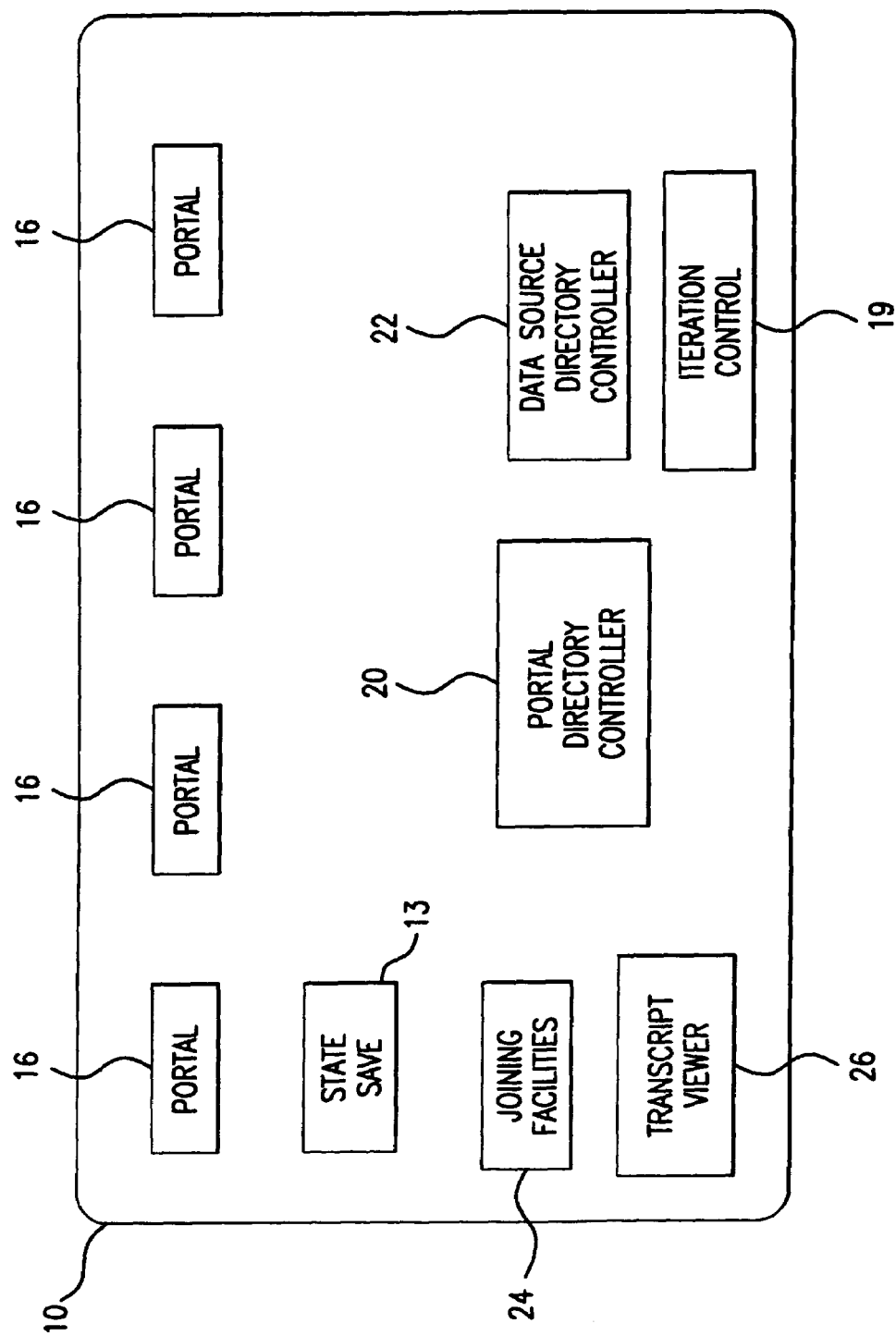
FIG. 7 is a block diagram of the operating components of the present system.
Figure 8:
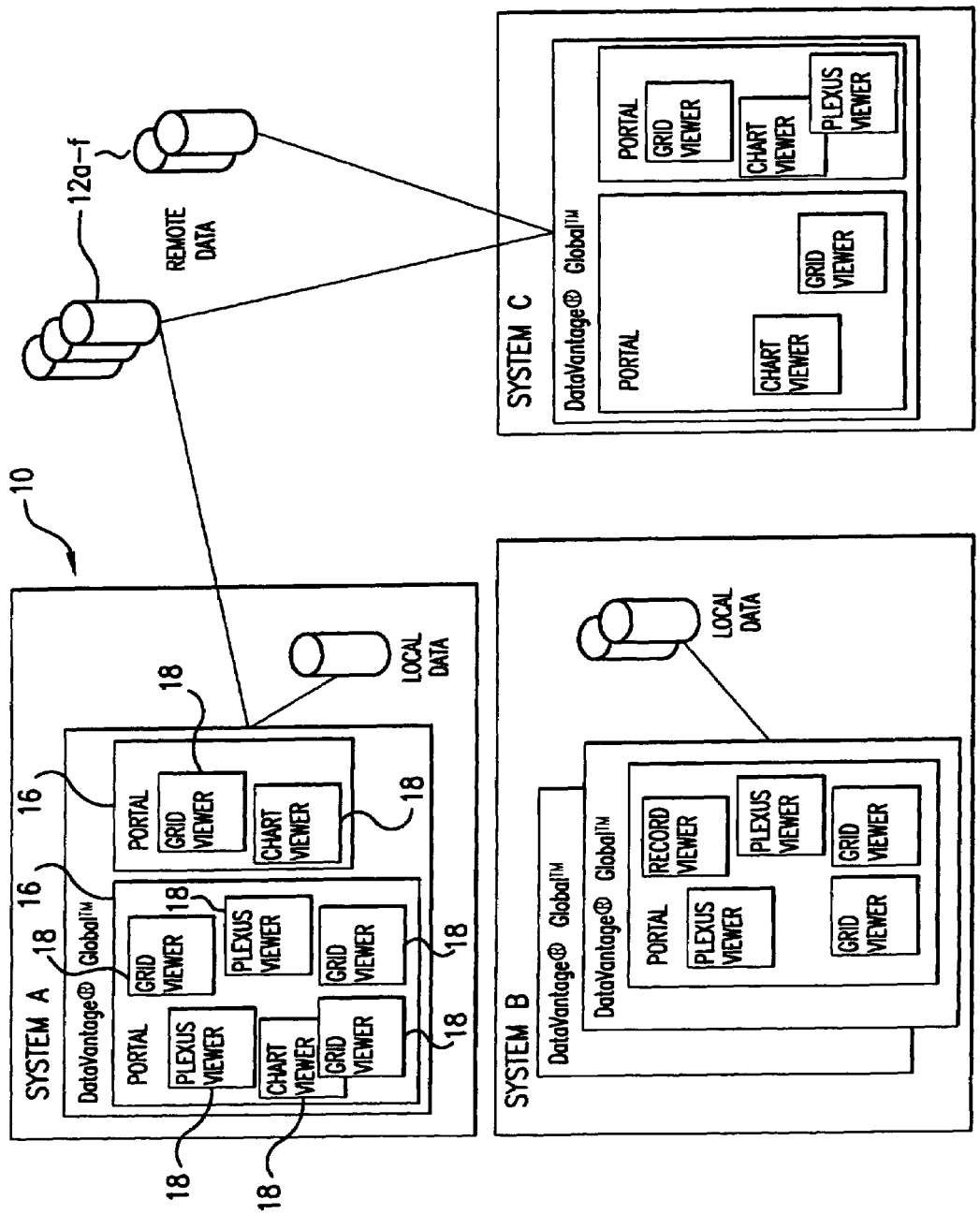
FIG. 8 is a schematic of a portal in accordance with a preferred embodiment of the invention.

With reference to FIG. 6, FIG. 7, and FIG. 8, the system 10 of the present invention uses portals 16 to access and analyze data from different data sources. In accordance with a preferred embodiment, portals 16 are tools used to collect, visualize, analyze and often directly edit data sets associated with potentially different data sources that are accessible to the system. As such, a portal may be considered as a collection of data gathering, analysis and visualization tools. From the user's perspective, portals 16 are composed of a user-specified, arbitrary collection of viewers 18a-d, where an individual viewer may be, for example, a three-dimensional table, a chart, or a plexus viewer, as illustrated in FIGS. 1A-E. Various different viewers may be used in alternative embodiments. An example of such viewers is the SQL viewer that can be used to execute a specific SQL query and view the return codes. Another example in a specific embodiment is the record viewer showing a row of data at a time. This viewer is helpful in cases when data has multiple columns, and in a preferred embodiment may implement the added convenience of VCR-style controls, where data can quickly be reviewed in both directions.

In a preferred embodiment, each viewer is connected to a specific data source 12a-f. Because portals may generally have multiple viewers, they are used to organize these viewers and to create and manage arbitrary collections of user-specified data analysis tasks associated therewith. In accordance with the present invention, portals 16 typically have a purpose, such as testing database applications, or refining the quality for a collection of data. Separate portals may be created for each type of analysis. As discussed below, upon opening a portal 16 (cataloged in the Portal Directory 20), the viewers 18a-d of the portal are re-connected to their respective data sources and prepared for subsequent analysis.

The portals 16 used in the present invention increase user productivity by displaying all of the viewers 18a-d related to a portal 16, and by executing all of the queries required for viewers 18a-d at the time when the portal 16 is opened. Generally, portals 16 and data source connection information are saved for future use and can be shared with others. This ability is provided by the state save facility 13 that captures workflow and allows a user to continue using the system 10 where they left off, without having to recreate their work. The state save facility is described in further detail in Section 1.4.4.

FIGS. 7 and 8 illustrate in block diagram form a Portal Directory Controller 20 used in a preferred embodiment. The Portal Directory Controller 20 (see also FIG. 13) visually manages portals. Portals 16 are integral to the utilization of the system, and usually are the system elements that are used most. Because of this, the Portal Directory Controller 20 is always present on the desktop, unlike other frames that may be deleted. As shown in FIG. 8, in a preferred embodiment the system may have access to both local and remote data sources. In effect, there is no restriction placed on the number or type of data sources, and their physical location. For example, remote data sources 12a-f may be remotely accessible via some telecommunications network, such as the Internet, an intranet, an extranet linked to an intranet or any combination thereof.

The Portal Directory Controller 20 facilitates the creation, organization and management of portals 16. Controller 20 in a preferred embodiment uses a tree structure allowing the user to easily navigate from a registered portal folder (see FIG. 13, 19), such as manufacturing, down to folders corresponding to individual plants and down further levels of the hierarchy—into assembly, and finally into product models (see FIG. 8).

Figure 9:
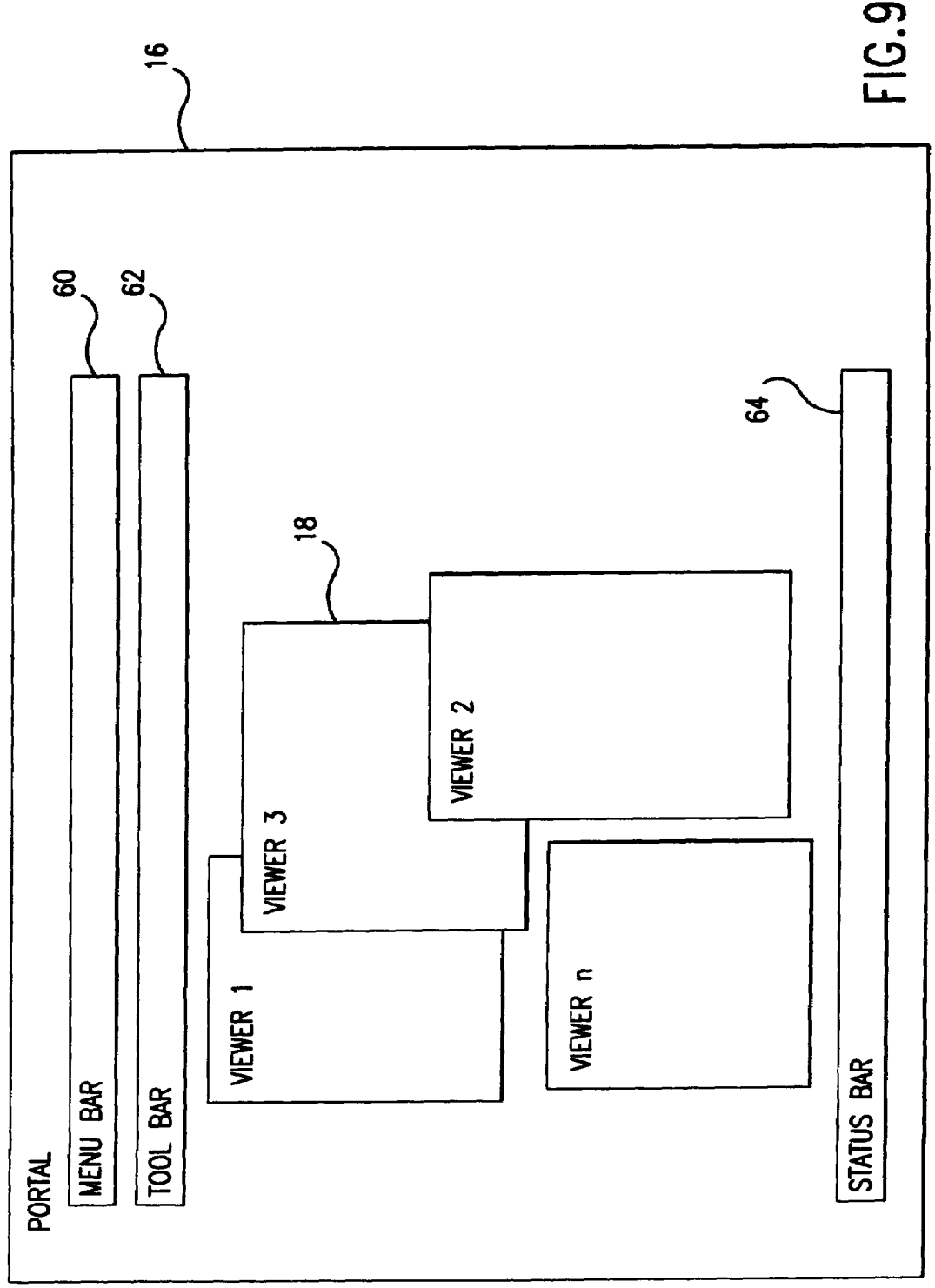
FIG. 9 is a schematic of a portal interface in accordance with a preferred embodiment of the invention.

When a registered portal 16 is opened, in accordance with this invention any analysis previously performed is shown (see FIG. 9). This ability of the system to remember what was previously performed saves a user the effort of re-creating analyses and is a powerful productivity tool unique to system 10 of the present invention. Analysis and source connections are also preferably shared with other users of the system.

As mentioned above, portals 16 form a major portion of the system 10 and are at the heart of the system. The portals 16 improve productivity by organizing and presenting analysis. The portals 16 also perform the entire analysis (redisplaying all of the viewers in the portal) automatically when a portal 16 is opened. This includes re-executing the queries related to the viewers 18a-d.

Referring to FIGS. 8 and 9, a schematic and actual representation of a portal 16 interface in accordance with this invention are respectively illustrated. As shown, a portal 16 includes at least one viewer 18, a menu bar 60, a tool bar 62 and a status bar 64.

In addition to functioning as a collection of data analysis tools, the portals 16 in a preferred embodiment act as a proxy for a work session by capturing session-like information. Thus, portals 16 are used to collect information about a particular situation. After data are found in the system 10 using its data source directory controller 22, the data is analyzed using the visualization techniques available through the portal 16.

The ability of the system 10 to associate data to viewers 18a-d that utilize visualization techniques makes it possible to perform sophisticated analysis. Specifically, data is described to the system 10 using the data source directory controller 22. The information tells the system 10 where to find a data source and what data should be retrieved when the data are called for. Once the data are defined to the system 10, the data may be bound to viewers 18a-d for analysis and iteration, creating data sets, comparisons of data sources and others.

Figure 12:
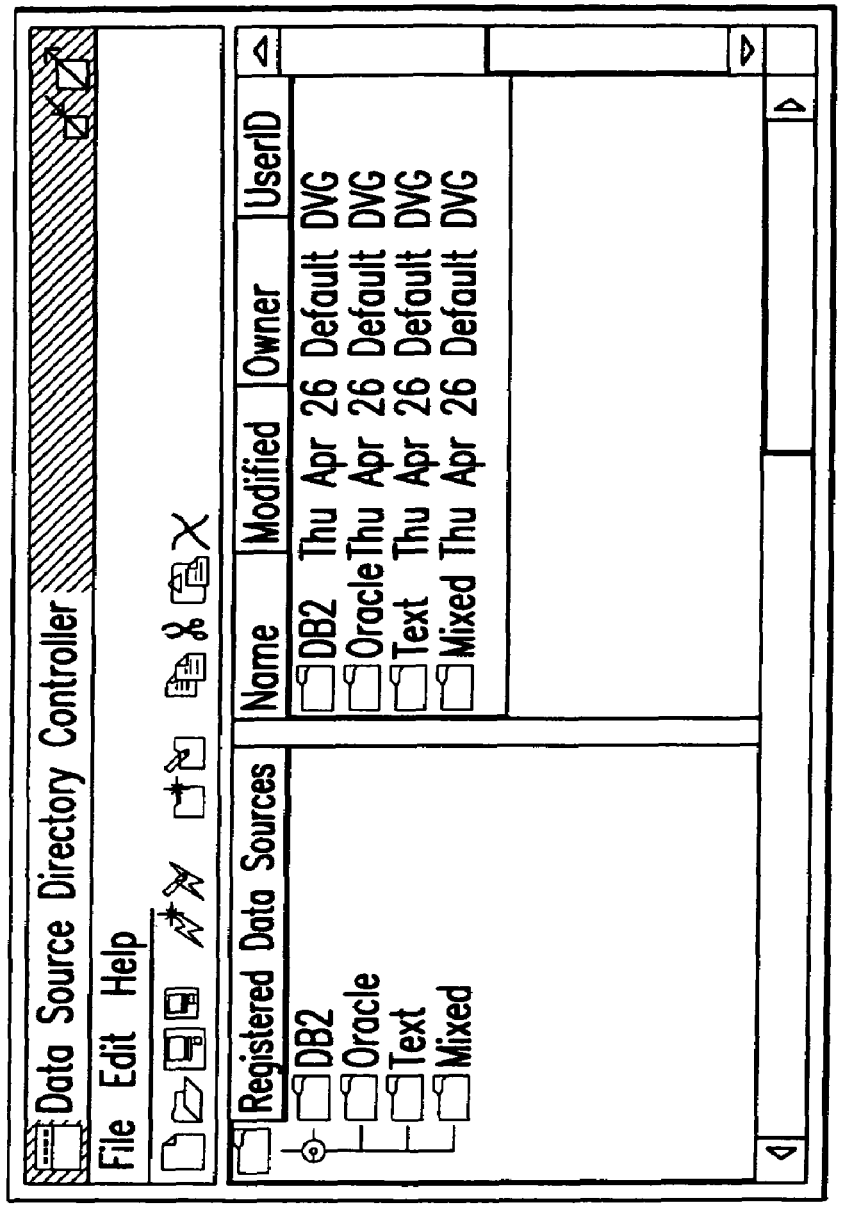
FIG. 12 is an illustration of a Data Source Controller frame with sample data.

In a preferred embodiment, the system 10 uses an adjunct controller to separately manage the potentially thousands of data sources that may be used by the portals. This is the Data Source Directory Controller 22 (see also FIG. 12). This controller visually manages the specifications of the data source wherein each data source specifies connection to one or more data systems, such as ORACLE or VSAM. With this controller, users can create, edit, organize, select, and delete data sources. In fact, the connections maybe organized in any manner one would like. For example, one could create data source folders that collect data by content, department, project and any or all permutations. Once a data source has been created, the data may be accessed via one or more portal viewers, as specified above.

In practice, data sources may be described as connections to single sources of data or may be connected as simple, or complex, tree structures. In this manner, hierarchical data connections maybe created. By highlighting a data source in the data source directory controller 22 and a opening data viewer 18a-d in a portal 16, the data from the data source connection is bound to the viewer 18a-d and the data are displayed in the viewer 18a-d. The hierarchy of tree structures can be viewed preferably using the hierarchical grid viewer.

The Data Source Directory Controller 22 broadly provides a facility to describe a data source. Data are described in a preferred embodiment using standard structured query language (SQL). Typically, this SQL description is automatically generated from data field entries and graphical selection. This also includes a joining facility 24 that creates joins of the table descriptors, which may be either explicit or virtual. A user of the system does not need to know SQL to perform these functions. It is further contemplated that a more sophisticated query may be used, providing that the user modifies this basic information.

In addition to working with a data source that is selected in the Data Source Directory Controller, in a preferred embodiment each Viewer maintains a clone of the original data source, thus allowing this clone to be individually modified without affecting other elements of the system that may be using the data source. Access to this clone is through the Select Data Source menu item of the viewer.

The Portal Directory Controller and Data Source Directory Controller are further specified below.

1.4.5. Workflow Concept for Saving, Restoring, Sharing and Merging Data Quality Control Work Java technology provides basic serialization facilities for individual runtime objects to be made persistent. However, additional services are required to capture all data to effectively save work in progress or completion, such that the information can be restored and shared in an open environment. The open environment aspect adds considerable complexity to the Workflow Manager implementation in the system of this invention, which manager provides the fundamental save, share and restore facilities and the extended service for merging shared resources into an existing environment.

Two facilities provide most of the support for workflow management in a preferred embodiment:

the Data Source Directory Controller; and the Portal Directory Controller

The basic services of these controllers can be categorized as follows:

1. Save and Open Services, which are specialized "helper" services that allow users to save and reload working-in-progress. For example, option and file dialogs are provided to give a user the ability to select resources and options to reload a previously saved working-in-progress.

2. Share work results, which are specialized "helper" services for user sharing of working in progress.

Figure 21:
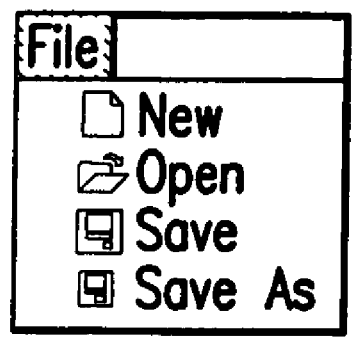
FIG. 21 is a graphic image of the File Menu that is used for both the Portal and Data Source Directory Controllers.

The File Menu (see FIG. 21) is identical to both controllers, but is applied respectively to either a portal or a data source directory.

In addition to the above, the system of this invention provides specialized extended services that are automatically applied dependent on the resource type that is being manipulated. Such services include:

3. Portal State Save and Open Services, which are specialized extended services to capture and externally represent portal information such that it may be saved and restored, shared or merged in an open environment. For example, specialized services are used to manage the merger of a shared portal with that of an existing portal in a session owned by a different user.

4. Data Source State Save and Restore Services, which are specialized extended services to capture and externally represent data source information such that it may be saved and restored, shared or merged in an open environment. For example, specialized services are used to manage the merger of one or more shared Data Sources into that of a new Data Source Directory.

The Portal Directory Controller frame (see FIG. 13) and the Data Source Directory Controller frame (see FIG. 12) are laid out as regular frames. Both frames have a menu bar on the top with a tool bar underneath. Below the toolbar for these two controllers are either the registered portal frames or the registered data sources. The behavior of the portal and data source frames is substantially the same. Therefore for simplicity, only the portal management will be described.

Referencing FIG. 18, the left portion of the frame displays the folder hierarchy, in which icons represent folders. The folder hierarchy is expandable and collapsible, with branches in the hierarchy being identified by icon buttons, as follows:

1. An icon button with a horizontal handle signifies a branch that is collapsed. To expand a branch, the user has to click the button.

2. An icon button with a vertical handle signifies a branch that is expanded. To collapse the branch, the user has to click the button.

Preferably, the user may change the icons used to expand or collapse branches to other icons, such as to the plus and minus sign icons. Double-clicking the folder icon in the content (right-hand) frame may also expand a folder. In this way, the folder is selected and displayed in the left-hand frame, while its contents are displayed in the right-hand frame.

In the example above, the folder My Portals is collapsed. FIG. 19 illustrates an example, in which the My Portals folder is expanded. The frame on the right displays the contents of the selected folder. It will be apparent that a folder may contain other folders, portals, or both. Clicking on My Portals in the right-hand frame displays its contents, as shown in FIG. 20. In a preferred embodiment, when an existing portal is opened, the last state of the portal before it was closed is displayed, saving the user time and effort to recreate the analyses that performed in the previous logon session. The state-save facility used in this preferred embodiment also enables simple sharing of data among users of the system.

Referencing FIG. 14, highlighting a Folder and selecting Edit Folder menu item will open and display the Edit Folder Information dialog box that allows users to modify the folder information. Selecting a highlighted Portal can do the same.

Although the View Menus for portal and data source directory controllers are substantially similar, their behavior is different due to different resource types. Therefore, these menus are discussed individually.

The Portal Directory View Menu (see FIG. 14 and FIG. 15) manages the portal directory and the creation, destruction and organization of individual portals:
1. New Portal—Create a new portal
2. Open Portal—Open the highlighted portal
3. Edit Portal—Edit the highlighted portal
4. New Folder—Create a new Portal Directory Controller folder
5. Edit Folder—Edit the highlighted Portal Directory Controller folder
6. Copy places a copy of the selected folder or Portal onto the clipboard for subsequent pasting.
7. Cut Places a copy of the selected folder or Portal onto the clipboard for subsequent pasting and then deletes the selection after pasting.
8. Paste pastes the folder or Portal from the clipboard into the selected folder.
9. Delete—Delete the selected object (portal or controller)

The Portal Directory Controller toolbar (see FIG. 15) below the menu bar contains icons that may be clicked on, to execute the commands contained in the menu bar (explained above). By right-clicking a toolbar button, help for that action is displayed as specified below.

The Data Source Directory Edit menu (see FIG. 16) allows users to create, edit, organize or delete a folder or data source. The Edit menu items are:
1. New Data Source—Opens the New Data Source Information dialog box for creation of a new data source in the selected folder.
2. Edit Data Source—Opens the Edit Existing Data Source dialog box for the selected data source.
3. New Folder—Creates a new folder in the selected folder.
4. Edit Folder—Edits the selected folder's information.
5. Copy—Places a copy of the selected folder or data source onto the clipboard for subsequent pasting.
6. Cut—Places a copy of the selected folder or data source onto the clipboard for subsequent pasting and then deletes the selection after pasting.
7. Paste—Pastes the folder or data source from the clipboard into the selected folder.
8. Delete—Deletes the selected folder or data source.

The Data Source Directory toolbar (see FIG. 17) below the menu bar contains icon buttons, which may be clicked to execute the commands contained in the menu bar. Right-clicking a toolbar button causes help for that action to be displayed, as specified in Section 1.4.5.

In a preferred embodiment, when a portal 16 is opened, it opens in the same state it was in prior to closing the portal 16. When the portal 16 is opened for the first time, it is opened using default information. If a previously saved portal 16 is opened for the first time in a current session it opens using its state at the time of the last save. More specifically, with reference to the state-save facility 13, each portal 16 is associated with a portal directory controller 20 and a data source directory controller 22.

To make the portal state persistent, the system 10 of the present invention analyzes the state of the portal 16 during operation. In particular, the system determines which data sources 12a-f are used in the portal 16, as well as the viewers 12a-d to which the data source 12a-f is associated. The same state may then be used at a later time to return to the portal 16 to its original state at the time of the save. When a portal 16 is saved, the data source connections associated with the portal 16 are also saved.

Figure 10:
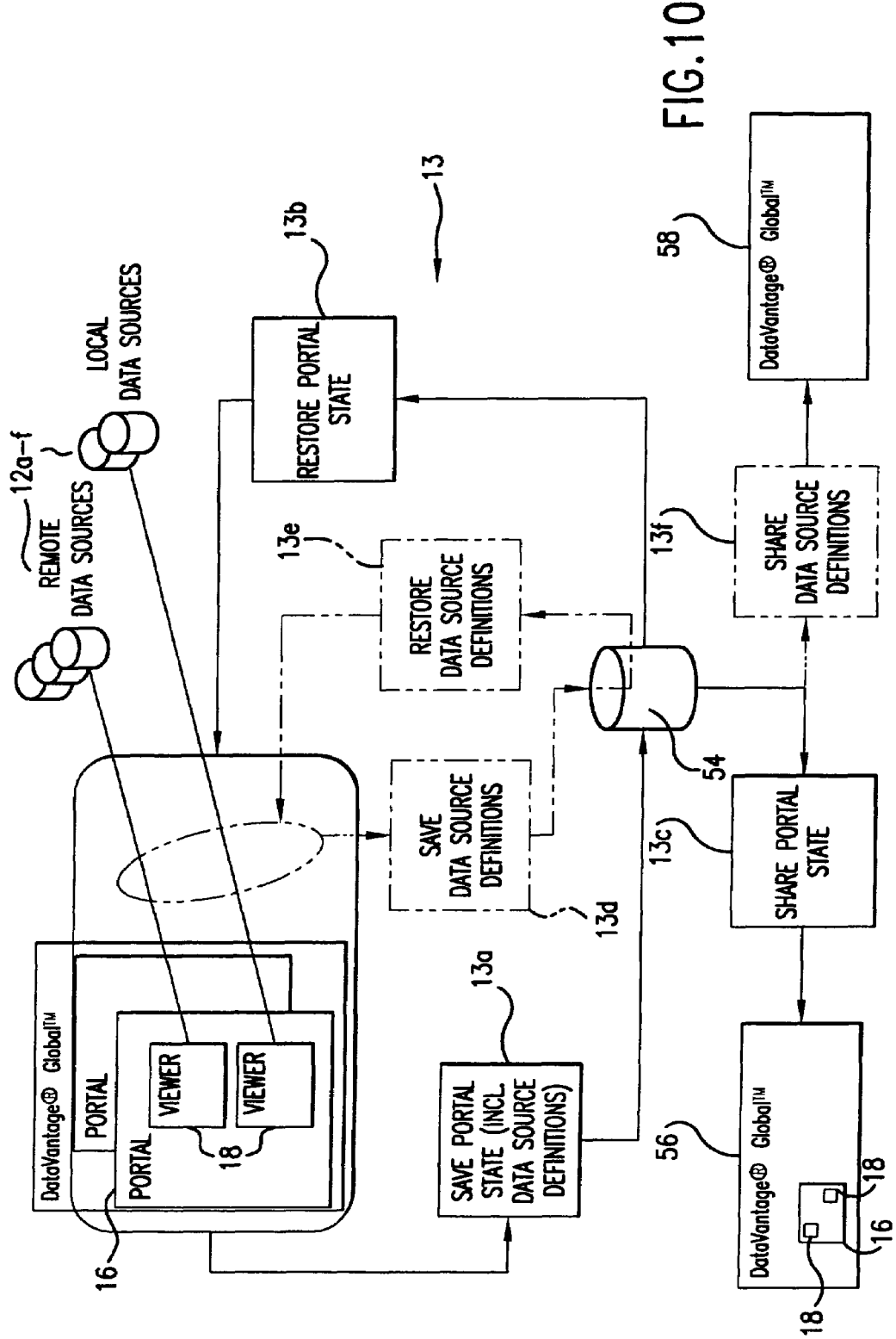
FIG. 10 is a block diagram of the state save facility used in accordance with the present invention.

With reference to FIGS. 1, 5 and 10 the state-save facility 13 is utilized by the Data Source Directory Controller 22 and Portal Directory Controller 20 to restore themselves to a prior state upon the reinitiating of a portal 16. The information associated with the state-save facility 13 maybe exported and shared with others. The other users may then use the portal 16 as it is or the other users may modify the portal 16 for their own personal use. The features of the state save controller 13 make users more productive by allowing the execution of analysis at the click of a mouse. That is, when a portal 16 is opened, all of the viewers 18a-d in the portal 16 are reopened by the system 10 without the need for the user to recreate all of the work needed to create the viewers 18a-d.

Through the use of the state-save facility 13, the system of this invention is capable of saving particular states of the system, allowing users of the system to reproduce their work without replicating the effort or work required to recreate all of the elements of the analysis. There are two distinct state saves in accordance with this invention. One state save is a subset of the other state save. As a result, a user may save the state of the portals or a user may save data source definitions. Saving of the portal state involves saving all of the state information necessary to recreate the portal, including all data source information associated with the portal.

With regard to the state-save function, that is, the save portal state 13a, the state save facility 13 determines the viewers associated with the portal 16 and the data sources 12a-f to which they are connected. The state save facility also determines the states of other relevant data. This information is then serialized and saved to data files 54 for subsequent retrieval. This state save facility 13 includes the type of viewer(s) 18 that is opened and its related data source information. As each portal 16 may have many types of viewers 18, that is many instances of each type, this state save facility 13 is capable of identifying all viewers 18 being utilized by a specific portal 16. This information is sufficient to recreate each instance of viewers 18 in the portal 16 without the need for user intervention.

In addition to saving the viewers 18 being used by a portal 16, the save portal state 13a also saves data source definitions for each instance of a viewer 16. In accordance with a preferred embodiment, the data source definitions that are saved contain sufficient information to recreate the viewer in an open environment, without the intervention of a user. An open environment in this application is one that supports a dynamic selection of portals, each having a dynamic set of viewers, which in turn access data sources that may be changing arbitrarily over time. The information that must be saved to re-create the viewer in an open environment comprises: all data specifying a JDBC connection, the properties which represent the user's preferences of viewing data in a viewer, the collection of specifications about each viewer in a portal, the collection of specifications about each portal, and the specification for both the portal and data source directories. The actual amount of information, which must be saved will clearly vary based on the environment.

When one wishes to restore a specific portal 16, the restore or "open" portal state process 13b is initiated. The restore portal state process 13b takes the serialized files from the save portal state process 13a and recreates the original work without user intervention. This includes loading information back into the system that will allow the portal 16 to be recreated. The restore portal state process 13b analyzes the serialized information and recreates each of the viewer 18 instances within the portal 16. This process includes the creation of viewers 18 connected to the appropriate data source 12a-f. The restore portal state process 13b also includes the creation of viewers 18 connected to the appropriate data sources 12a-f. The restore portal state process 13b further provides for the creation of new connections to data sources 12a-f, so that the viewer 18 does not need to replicate the work necessary to create each of the viewers 18 in the portal 16. In accordance with this invention, when a portal 16 is opened, the system recreates all of the viewers 18 in the portal at the time of the state save, connects the viewers 18 to their related data sources 12a-f, executes data queries, and displays the data for all of the viewers in the portal.

Storing portal information in accordance with a preferred embodiment also provides users with the ability to share portal information. Portal facility sharing is enabled through a share process 13c, which takes the files created by the save portal state process 13a and re-creates portals 16 in an environment 56 different than the one in which they were created. This includes creating all of the instances of the viewers contained in the original portal and the related data source definitions. When the portal 16 is opened, the system will recreate all of the viewers 18 in the portal 16 at the time of the state save, connect the viewers 18 to their related data sources 12a-f, execute data queries, and display results in viewers 18.

In a preferred embodiment, the state save facility also saves the related data sources. Accordingly, the save data source process 13d may be considered a subset of the save portal process 13a. The save-data-source process 13d analyzes all of the state and other known information regarding data sources 12a-f, serializes this information and stores it in files 56. These files 56 may be restored or shared with other users. The stored data generally is sufficient to create a connection to the data sources 12a-f when they are re-opened or shared.

When a user wishes to restore a data source, the restore-data-source process 13e is initiated. This process takes the files prepared by the save-data-source process 13f and restores the states to their previous status. Once the status restoration is complete, a connection to the data set associated with data sources 12a-f is established without user intervention. This avoids the need to recreate the information when establishing a connection to a data source.

As with the related portal save-state process 13a, a data source may be shared between multiple users of the system. In accordance with the share-data-source process 13f, files prepared by the save data source process 13d are restored based upon state, and other stored information. Once this process is complete, a connection to a data source may be created without user intervention. Again, this feature avoids the need to recreate the data source definition information in the new instance 58 of the system, and enables users to create a quick connection to the data source.

1.4.6. Right-Click for Menu and Tool Bar Help

Figure 11:
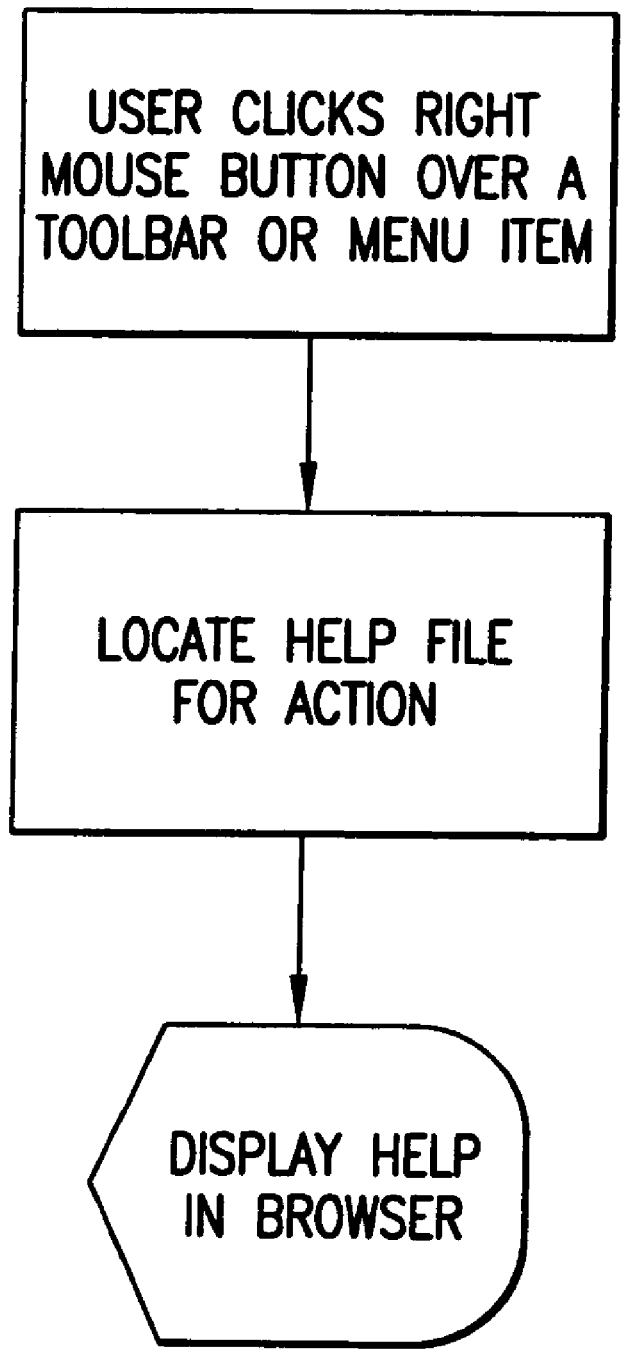
FIG. 11 is a logic flow chart of the help facility used in a specific embodiment.
Figure 22:
FIG. 22 is an example of an explicit help facility that is a menu item in the Data Source Directory Controller.

A number of conventions have been developed in accordance with the present invention for assisting a user with rapid and context sensitive help. This aspect of the invention is directed to a specific approach to providing quick and direct help to the user. With reference to FIG. 1, although each displayed frame of the system has explicit help facilities (see also FIG. 22), there are also additional implicit help features for getting rapid and context-specific help for menu and toolbar items. In a preferred embodiment, a menu or toolbar item is simply selected by clicking the night button (sometimes called the "meta" button) of a mouse. This causes immediate display of the help information for that item. FIG. 11 depicts the basic logic flow for this operation.

In particular, in the first step the user clicks a pre-specified button (preferably the meta button on the mouse) over a toolbar or menu item. In the next step help information for the particular item is located in the help files of the system. Finally, the help information is displayed to the user, preferably near the location of the item for which help was requested. In accordance with a preferred embodiment, right clicking a menu item or tool on the graphical user interface of the system 10 causes context-sensitive help for that item to appear. This approach differs from most prior art help systems, which require the user to work his or her way through the help system to find the specific help for a menu item. By bringing to the user directly, and with minimum effort the desired help information, the system of this invention makes use of the GUI more effective and provides user's convenience and productivity.

1.4.7. Multiple Transcripts for User Action Logging, Editing and Reporting

Figure 23:
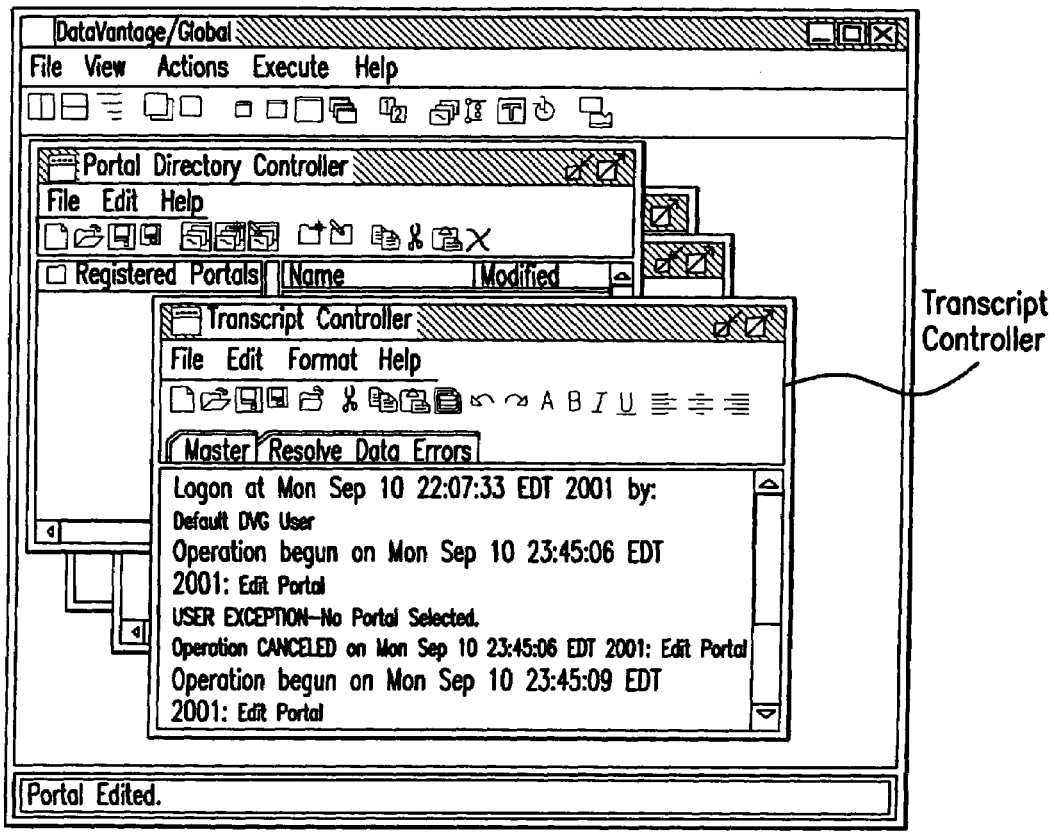
FIG. 23 is an example of the Master Transcript with an additional Working Transcript.

The Transcript Manager used in accordance with the present invention records user actions and at its basic level essentially provides a log. In a preferred embodiment, however, the transcript manager provides additional services, such as running multiple concurrent transcripts, preferably with rich text editing and embedded graphics. In keeping with the so-called "model-view-controller" approach, the Transcript Manager in a preferred embodiment can be visualized by the view called the Transcript Controller (see FIG. 23). The model is that of potentially thousands of objects and their state parameters about every Transcript that it is managing.

The present system further maintains a transcript of user actions. These user transcripts may be edited, created and saved. This permits the preservation of complete analyses from one user session to another. In a preferred embodiment, a permanent Master Transcript that is read-only is assigned to each user at the beginning of a session. This transcript captures all actions performed during a logon session. System Administrators and Auditors may use this facility to track user actions. In another embodiment, a user may create one or more additional working transcripts, wherein each transcript is automatically updated at the same time the read-only transcript is updated. A transcript entitled "Resolve Data Errors" is an example of an additional open transcript used in accordance with the invention. A working transcript provides a means for a user to edit one or more working transcripts, while preserving the integrity of the read-only transcript. Such work transcripts are useful for documenting the findings of an analysis or generating a status report on an activity. As noted, a Master Transcript is not editable; however, entries in the transcript may be copied and used in other transcripts. The present invention imposes no limit on the number of transcripts that may be opened, which feature is especially useful for mission critical actions and user-editable transcripts.

Figure 25:
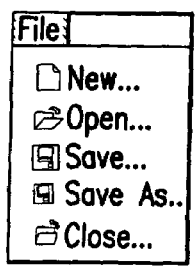
FIG. 25 is a graphic image of the Transcript Controller's File Menu.

Following is a brief description of the File menu for the Transcript Controller used in a preferred embodiment (see FIG. 25). This menu is used to create new transcripts, open existing transcripts, save transcripts, and close transcripts. As shown, the File menu has the following menu items:

1. New—Creates and opens a new transcript.
2. Open—Opens a saved transcript.
3. Save—Saves the active transcript to a file.
4. Save As . . . —Saves the active transcript under a new name.
5. Close—Closes the active transcript.

Figure 24:
FIG. 24 is a graphic image of the Transcript Controller's toolbar.

In a preferred embodiment, the Master Transcript for a user is automatically saved upon termination of a logon session. Further, a previously saved Master Transcript may be opened for review, but a user is not permitted to edit it. User transcripts may or may not be saved at the user's discretion. The Transcript toolbar (see FIG. 24) below the menu bar contains icons that may be clicked on, to execute various commands in the menu bar.

Figure 26:
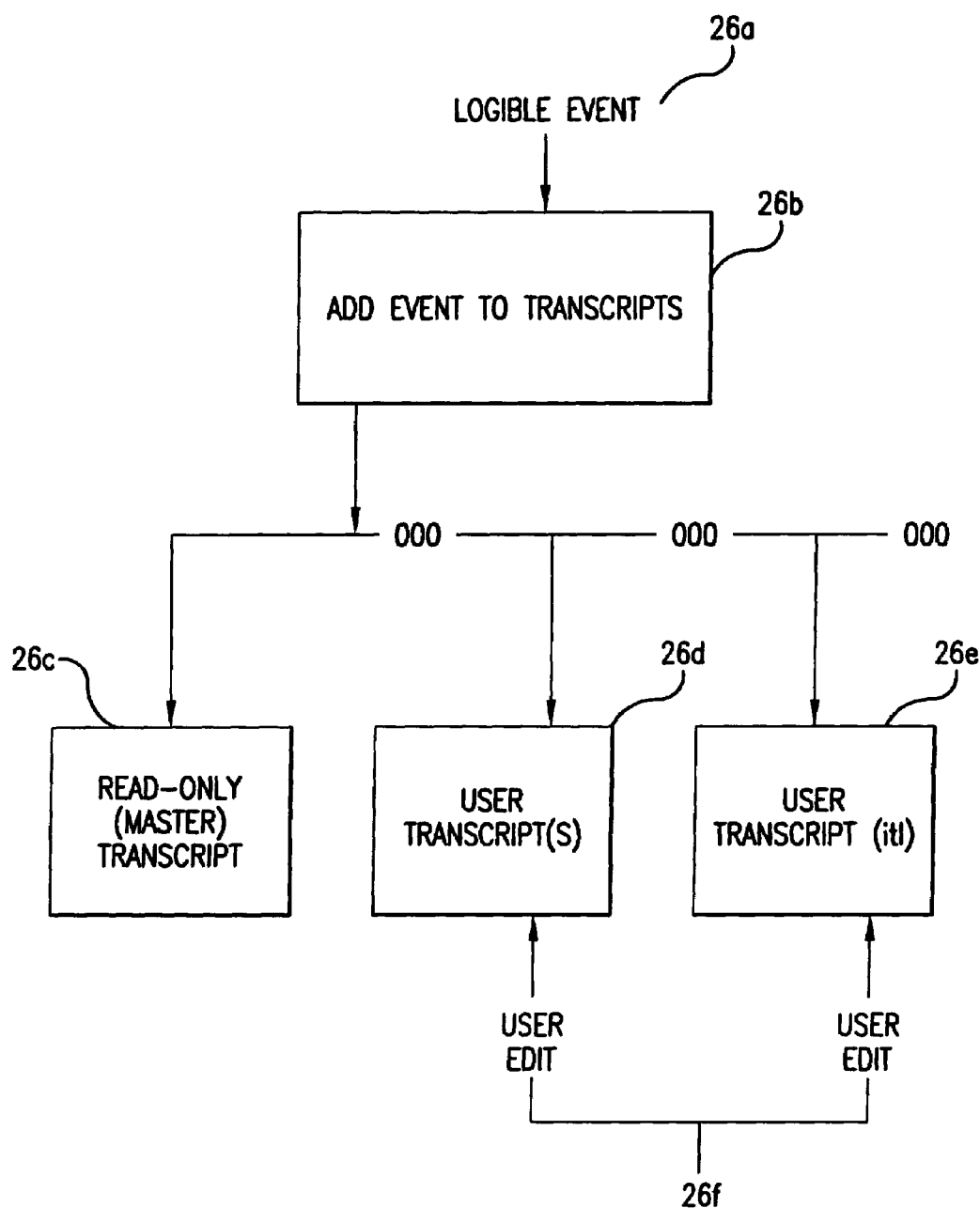
FIG. 26 illustrates the flow of data for routing inputs for multiple transcript handling.

FIG. 26 illustrates the flow of data for routing inputs for multiple transcript handling.

Two types of inputs are used:
1. Log events 26a for the host system and
2. User inputs 26f intended for only one of the designated transcripts The log events 26a are events generated by the host system. The events are transformed into text edit instructions 26b with are in turn broadcast to the Master Transcript 26c and all of the active user transcripts. The user inputs 26f are user-entered edit instructions typically resulting from keyboard and mouse operations. The transcripts 26c, 26d and 26e are objects with functionality to perform the edit instructions.

While the foregoing has described and illustrated aspects of various embodiments of the present invention, those skilled in the art will recognize that alternative components and techniques, as well as various combinations and permutations of the described components and techniques, can be substituted for, or added to, the embodiments described herein. It is intended, therefore, that the present invention not be defined by the specific embodiments described herein, but rather by the appended claims, which are intended to be construed in accordance with the well-settled principles of claim construction.

Appendix A contains listings of source code directed to aspects of the system and method of the present invention. These listings and other portions of the disclosure of this patent document contain material that is subject to copyright protection. The copyright owner has no objection to the facsimile reproduction by anyone of the patent documents or the patent disclosure as it appears in the Patent and Trademark Office patent file, but otherwise reserves all copyright rights whatsoever.

What is claimed is:

1. A data management system comprising:
an interface connecting the system to one or more data sources;
at least one facility linked to the interface for managing the one or more data sources;
at least one portal comprising a plurality of data viewers; and
a state-save facility that rebuilds the data viewers in a subsequent session;
wherein the system allows more than one portal to be viewed simultaneously;
wherein each data viewer has access to one or more data sources and is configured to analyze data in the data sources and display the results of said analysis;
wherein each portal and each data viewer has the ability to perform one or more of the following management features; create, save, open, edit, merge and destroy;
wherein the system allows one or more data viewers from one portal to be merged into another portal;
wherein the state-save facility comprises a facility for monitoring and recording data sources used by the data viewer to which each data source is associated; and
wherein a portal is either open or closed and information from the state-save facility is used to rebuild all of the data viewers associated with a particular portal by requerying the data sources associated with said data viewers at the point in time in which the portal is reopened.

2. The system of claim 1, wherein one or more data viewers from one portal can be merged into another portal in the same user session.

3. The system of claim 1, wherein one or more data viewers from one portal can be merged into another portal in different sessions of the same user.

4. The system of claim 1, wherein one or more data viewers from one portal can be merged into another portal in a different session of a different user.

* * * * *